United States Patent
Leonard et al.

(10) Patent No.: US 8,029,021 B2
(45) Date of Patent: Oct. 4, 2011

(54) VEHICLE

(75) Inventors: Joshua J. Leonard, North Branch, MN (US); Richard Raymond Maki, North Branch, MN (US); Eric Bjerketvedt, North Branch, MN (US); Michael D. Schneider, Dalbo, MN (US); Bradley Robert Morisch, Lindstrom, MN (US); Brian D. Krosschell, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 224 days.

(21) Appl. No.: 12/092,153

(22) PCT Filed: Mar. 17, 2008

(86) PCT No.: PCT/US2008/003483
§ 371 (c)(1),
(2), (4) Date: Sep. 2, 2008

(87) PCT Pub. No.: WO2008/115461
PCT Pub. Date: Sep. 25, 2008

(65) Prior Publication Data
US 2009/0091101 A1    Apr. 9, 2009

Related U.S. Application Data

(60) Provisional application No. 60/918,502, filed on Mar. 16, 2007.

(51) Int. Cl.
*B62D 21/12* (2006.01)

(52) U.S. Cl. .......................... 280/785; 180/21
(58) Field of Classification Search ................... 180/21, 180/24, 311, 312; 280/781, 785
See application file for complete search history.

(56) References Cited

U.S. PATENT DOCUMENTS

| | | | |
|---|---|---|---|
| 2,672,103 A | | 3/1954 | Hohmes |
| 3,858,902 A | | 1/1975 | Howells et al. |
| 4,027,892 A | | 6/1977 | Parks |
| 4,098,414 A | | 7/1978 | Abiera |
| 4,422,685 A | * | 12/1983 | Bonfilio et al. .......... 296/193.04 |
| 4,561,323 A | | 12/1985 | Stromberg |
| 4,582,156 A | * | 4/1986 | Kochy et al. .................... 180/90 |

(Continued)

FOREIGN PATENT DOCUMENTS

CH        317 335 A      11/1956

(Continued)

OTHER PUBLICATIONS

International Preliminary Report on Patentability for PCT/US2008/003483 issued by the European Patent Office on May 11, 2009.

(Continued)

*Primary Examiner* — Paul N. Dickson
*Assistant Examiner* — Barry Gooden, Jr.
(74) *Attorney, Agent, or Firm* — Baker & Daniels LLP

(57) ABSTRACT

A vehicle (100) is disclosed. The vehicle may include a base portion (104) and a modular portion (112). The base portion may be a four wheel vehicle having an operator area (114) with seating for at least two occupants in a side-by-side arrangement. The modular portion may be coupled to the base portion resulting in a six wheel vehicle. The wheels (102) of the modular portion may be powered by an engine (500) of the base portion.

35 Claims, 29 Drawing Sheets

U.S. PATENT DOCUMENTS

| | | | |
|---|---|---|---|
| 4,730,870 A * | 3/1988 | DeRees | 296/193.04 |
| 4,821,825 A | 4/1989 | Somerton-Rayner | |
| 4,881,756 A * | 11/1989 | Kumasaka et al. | 280/785 |
| 4,934,737 A | 6/1990 | Nakatsuka | |
| 5,036,939 A | 8/1991 | Johnson et al. | |
| 5,251,713 A | 10/1993 | Enokimoto | |
| 5,401,056 A * | 3/1995 | Eastman | 280/785 |
| 5,863,277 A | 1/1999 | Melbourne | |
| 5,950,750 A | 9/1999 | Dong et al. | |
| 6,073,991 A * | 6/2000 | Naert | 296/187.02 |
| 6,092,877 A | 7/2000 | Rasidescu et al. | |
| 6,149,540 A | 11/2000 | Johnson et al. | |
| 6,199,894 B1 | 3/2001 | Anderson | |
| 6,467,787 B1 | 10/2002 | Marsh | |
| 6,622,968 B1 | 9/2003 | St. Clair et al. | |
| 6,695,566 B2 | 2/2004 | Rodriguez Navio | |
| 6,725,962 B1 | 4/2004 | Fukuda | |
| 6,752,235 B1 | 6/2004 | Bell et al. | |
| 6,786,526 B1 | 9/2004 | Blalock | |
| 6,799,779 B2 | 10/2004 | Shibayama | |
| 6,799,781 B2 | 10/2004 | Rasidescu et al. | |
| 6,916,142 B2 | 7/2005 | Hansen et al. | |
| 6,923,507 B1 | 8/2005 | Billberg et al. | |
| 6,978,857 B2 | 12/2005 | Korenjak | |
| 7,055,454 B1 | 6/2006 | Whiting et al. | |
| 7,124,853 B1 | 10/2006 | Kole, Jr. | |
| 7,125,134 B1 | 10/2006 | Hedlund et al. | |
| 7,140,640 B2 * | 11/2006 | Tronville et al. | 280/781 |
| 7,237,789 B1 | 7/2007 | Herman | |
| 7,239,032 B1 | 7/2007 | Wilson et al. | |
| 7,431,024 B2 | 10/2008 | Buchwitz et al. | |
| 7,441,809 B1 * | 10/2008 | Coombs et al. | 280/785 |
| 7,717,495 B2 | 5/2010 | Leonard et al. | |
| 2002/0067052 A1 * | 6/2002 | Platner et al. | 296/204 |
| 2002/0139595 A1 * | 10/2002 | Whelan | 180/209 |
| 2002/0147072 A1 | 10/2002 | Goodell et al. | |
| 2002/0157891 A1 * | 10/2002 | Hurlburt | 180/264 |
| 2002/0178968 A1 | 12/2002 | Christensen | |
| 2003/0001409 A1 | 1/2003 | Semple et al. | |
| 2003/0070861 A1 * | 4/2003 | Dahl et al. | 180/312 |
| 2004/0079561 A1 | 4/2004 | Ozawa et al. | |
| 2004/0108159 A1 | 6/2004 | Rondeau et al. | |
| 2004/0178007 A1 * | 9/2004 | Ima | 180/53.1 |
| 2004/0195797 A1 | 10/2004 | Nash et al. | |
| 2005/0161935 A1 * | 7/2005 | Ono et al. | 280/834 |
| 2005/0173177 A1 | 8/2005 | Smith et al. | |
| 2005/0173180 A1 | 8/2005 | Hypes et al. | |
| 2005/0248116 A1 | 11/2005 | Fanson | |
| 2007/0221430 A1 * | 9/2007 | Allison | 180/299 |
| 2008/0023240 A1 | 1/2008 | Sunsdahl et al. | |
| 2008/0023249 A1 | 1/2008 | Sunsdahl et al. | |
| 2008/0093151 A1 * | 4/2008 | Ogawa et al. | 180/296 |
| 2008/0308334 A1 | 12/2008 | Leonard et al. | |
| 2009/0000849 A1 | 1/2009 | Leonard et al. | |
| 2009/0071737 A1 | 3/2009 | Leonard et al. | |
| 2009/0071739 A1 | 3/2009 | Leonard et al. | |

FOREIGN PATENT DOCUMENTS

| | | |
|---|---|---|
| DE | 116 605 C | 2/1900 |
| DE | 17 55 101 A1 | 4/1971 |
| DE | 30 33 707 A | 4/1982 |
| EP | 0238077 A | 9/1987 |
| EP | 0 709 247 A | 5/1996 |
| EP | 0794096 A | 9/1997 |
| EP | 1 215 107 A | 6/2002 |
| EP | 1557345 A | 7/2005 |
| EP | 1 564 123 A | 8/2005 |
| JP | 11 334447 A | 12/1999 |
| JP | 2000 177434 A | 6/2000 |

OTHER PUBLICATIONS

International Search Report and Written Opinion for PCT/US2008/003485 issued by the European Patent Office on Aug. 27, 2008.
International Search Report and Written Opinion for PCT/US2008/003480 issued by the European Patent Office on Sep. 1, 2008.
International Search Report and Written Opinion for PCT/US2008/003483 issued by the European Patent Office on Oct. 2, 2008.

* cited by examiner

VEHICLE

CROSS-REFERENCE TO RELATED APPLICATIONS

The present application is a National Stage Application of International Application No. PCT/US08/03483, filed Mar. 17, 2008, titled VEHICLE, and claims the benefit of U.S. Provisional Application Ser. No. 60/918,502, filed Mar. 16, 2007, the disclosures of which are expressly incorporated by reference herein.

The present application is related to U.S. Provisional Application Ser. No. 60/918,556, filed Mar. 16, 2007, titled "VEHICLE"; U.S. Provisional Application Ser. No. 60/918,444, filed Mar. 16, 2007, titled "VEHICLE WITH SPACE UTILIZATION"; U.S. Provisional Application Ser. No. 60/918,356, filed Mar. 16, 2007, titled "UTILITY VEHICLE HAVING MODULAR COMPONENTS", U.S. Provisional Application Ser. No. 60/918,500, filed Mar. 16, 2007, titled "METHOD AND APPARATUS RELATED TO TRANSPORTABILITY OF A VEHICLE", the disclosures of which are expressly incorporated by reference herein.

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

FIELD OF THE INVENTION

The present invention relates generally to a vehicle and in particular to a reconfigurable vehicle.

BACKGROUND AND SUMMARY OF THE INVENTION

The present disclosure relates to vehicles, and more particularly to utility vehicles. It is known to provide utility vehicles which are 4 wheel drive and 6 wheel drive. It is desired to provide a vehicle which is easily convertible between the two. It would also be preferred to have such features as independent suspension systems available.

An exemplary vehicle is a vehicle having a base portion and a modular portion. In an exemplary embodiment, a vehicle is convertible between a base vehicle, such as a four wheel vehicle, and an extended vehicle, such as a six wheel vehicle.

Utility vehicles are available which comprise a plurality of ground engagement members, a main frame supported by a first portion of the plurality of ground engagement members, an engine supported by the main frame and configured to provide power to at least one of the plurality of ground engaging members, an operator area supported by the main frame, the operator area including seating for at least two occupants in a side-by-side arrangement, steering controls operatively coupled to at least a portion of the plurality of ground engagement members, and engine controls operatively coupled to the engine. For example, a utility vehicle of the type disclosed above is shown in our U.S. Pat. No. 6,923,507.

The present disclosure further discloses a modular frame supported by a second portion of the ground engaging members, where the modular frame is removably coupled to the main frame through at least three spaced apart connections which substantially prevent the modular subsection from pivoting relative to the main frame when the modular subsection is coupled to the main frame.

In an exemplary embodiment of the present disclosure, a utility vehicle is disclosed, comprising a plurality of ground engagement members; a main frame supported by a first portion of the plurality of ground engagement members; a modular frame supported by a second portion of the ground engaging members; an engine supported by the main frame and configured to provide power to at least one of the plurality of ground engaging members; and an operator area supported by the main frame. The operator area including seating for at least two occupants in a side-by-side arrangement. The operator area further including steering controls operatively coupled to at least a portion of the plurality of ground engagement members. The operator area further including engine controls operatively coupled to the engine. The modular frame being removably coupled to the main frame through at least three spaced apart connections which substantially prevent the modular subsection from pivoting relative to the main frame when the modular subsection is coupled to the main frame.

In another exemplary embodiment of the present disclosure, a utility vehicle is disclosed. The utility vehicle comprising a plurality of ground engagement members; a main frame supported by a first portion of the plurality of ground engagement members; a modular frame supported by a second portion of the ground engaging members; and an engine supported by the main frame and configured to provide power to at least one of the first portion of the plurality of ground engaging members and to at least one of the second portion of the plurality of ground engaging members. The modular frame being removably coupled to the main frame through at least three spaced apart connections which substantially prevent the modular subsection from pivoting relative to the main frame when the modular subsection is coupled to the main frame.

In a further exemplary embodiment of the present disclosure, a vehicle is disclosed. The vehicle comprising a plurality of ground engagement members; a frame supported by a first portion of the plurality of ground engagement members; an engine supported by the frame and configured to provide power to at least one of the plurality of ground engaging members; an operator area supported by the main frame and at least a first suspension system operatively coupled to a first ground engaging member and the frame. The operator area including seating for at least two occupants in a side-by-side arrangement, steering controls operatively coupled to at least a portion of the plurality of ground engagement members, and engine controls operatively coupled to the engine. The first suspension system including a control arm moveably coupled to the frame and moveably coupled to the first ground engaging member and a shock member moveably coupled to the frame and moveably coupled to the control arm. The frame and the control arm cooperate to provide multiple shock orientations.

In yet another exemplary embodiment of the present disclosure, a method of configuring a vehicle is provided. The method comprising the steps of providing a functional base vehicle portion; providing a modular vehicle portion; and coupling a modular frame of the modular vehicle portion to a main frame of the functional base vehicle portion to substantially prevent the modular frame from pivoting relative to the main frame. The functional base portion including a first plurality of ground engaging members, the main frame supported by the first plurality of ground engaging members, an engine supported by the main frame and operatively coupled to at least one of the first plurality of ground engaging members; and an operator area supported by the main frame. The operator area including seating for at least two occupants in a side-by-side arrangement, steering controls operatively coupled to at least a portion of the first plurality of ground engagement members, and engine controls operatively coupled to the engine. The modular vehicle portion including a second plurality of ground engaging members and a modular frame supported by the second plurality of ground engaging members.

In still another exemplary embodiment of the present disclosure, a utility vehicle is provided. The utility vehicle comprising a plurality of ground engagement members arranged on a front axle, a rear axle, and at least one intermediate axle; a frame supported by the plurality of ground engagement members; an engine supported by the main frame and configured to provide power to the vehicle; a first differential operably coupled to two of the plurality of ground engagement members; a transmission operably coupled to the engine; a first drive shaft operably coupled to the transmission and to the first differential; a parking brake having a disc coupled to the drive shaft; and a control module coupled to the first differential and the parking brake. The control module locking the first differential in response to a detection that the parking brake has been set.

In yet a further exemplary embodiment of the present disclosure, a utility vehicle is disclosed. The utility vehicle comprising a plurality of ground engagement members arranged on a front axle, a rear axle, and at least one intermediate axle; a frame supported by the plurality of ground engagement members; and an engine supported by the frame and configured to provide power to at least the rear axle through a first differential. The rear axle includes at least a first ground engaging member positioned on a first side of the first differential and at least a second ground engaging member positioned on a second side of the first differential. The utility vehicle further comprising an operator area supported by the main frame. The operator area including seating for at least two occupants in a side-by-side arrangement, steering controls operatively coupled to at least a portion of the plurality of ground engagement members, and engine controls operatively coupled to the engine. The utility vehicle further comprising a first suspension operatively coupling the first ground engaging member to the frame and a second suspension operatively coupling the second ground engaging member to the frame. The second suspension being independent of the first suspension.

The above mentioned and other features of this invention, and the manner of attaining them, will become more apparent and the invention itself will be better understood by reference to the following description of embodiments of the invention taken in conjunction with the accompanying drawings, where:

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
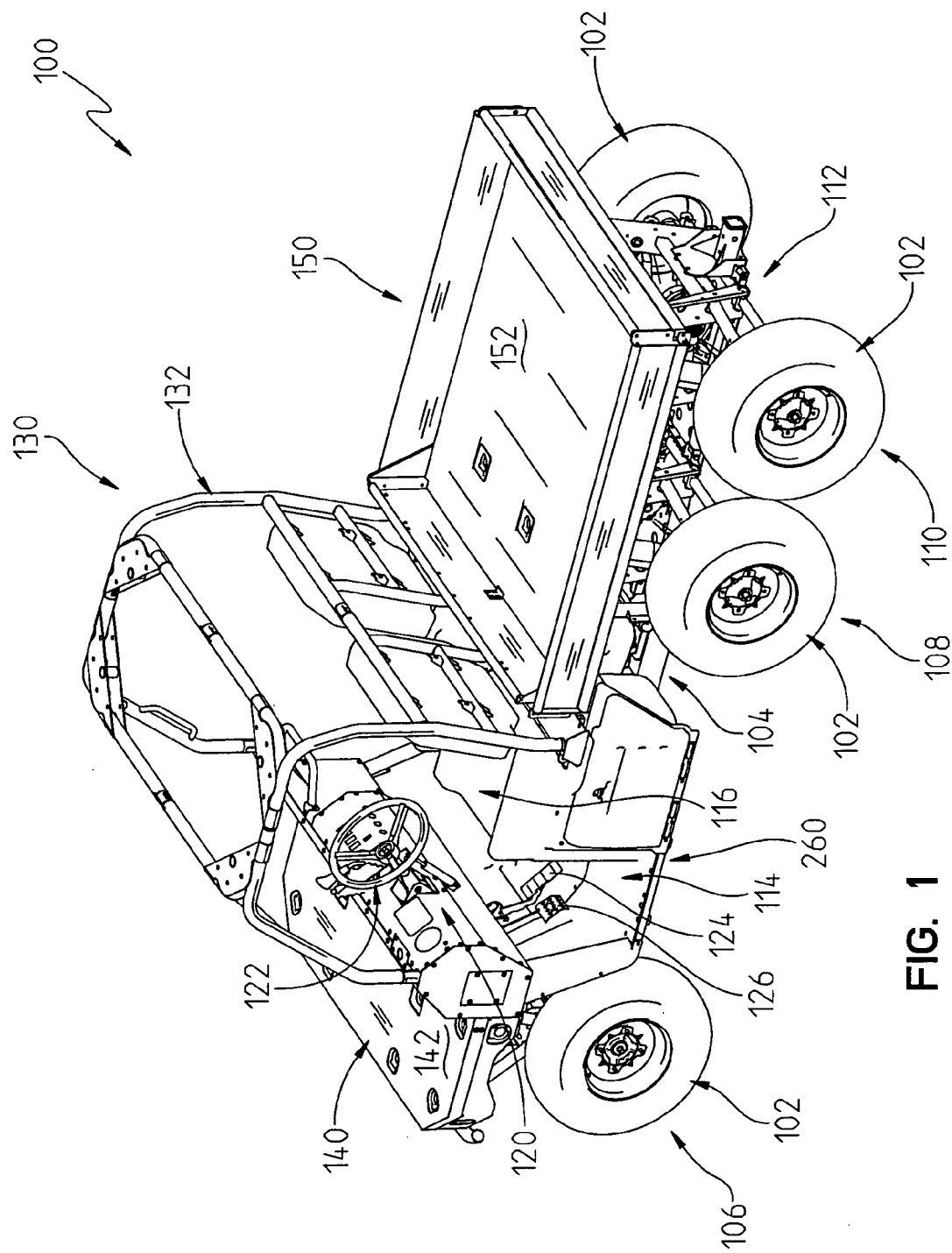
FIG. 1 is a rear, perspective view of a vehicle from a first side of the vehicle, the vehicle including a front platform and a rear platform.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110. In one embodiment, the wheels include run flat tires.

In one embodiment, one or more of the wheels may be replaced with tracks, such as the PROSPECTOR II tracks available from Polaris Industries, Inc. located at 2100 Highway 55 in Medina, Minn. 55340. In one embodiment, a track is placed around the ground engaging members of middle axle 108 and rear axle 110 on each side of vehicle 100.

Figure 8A:
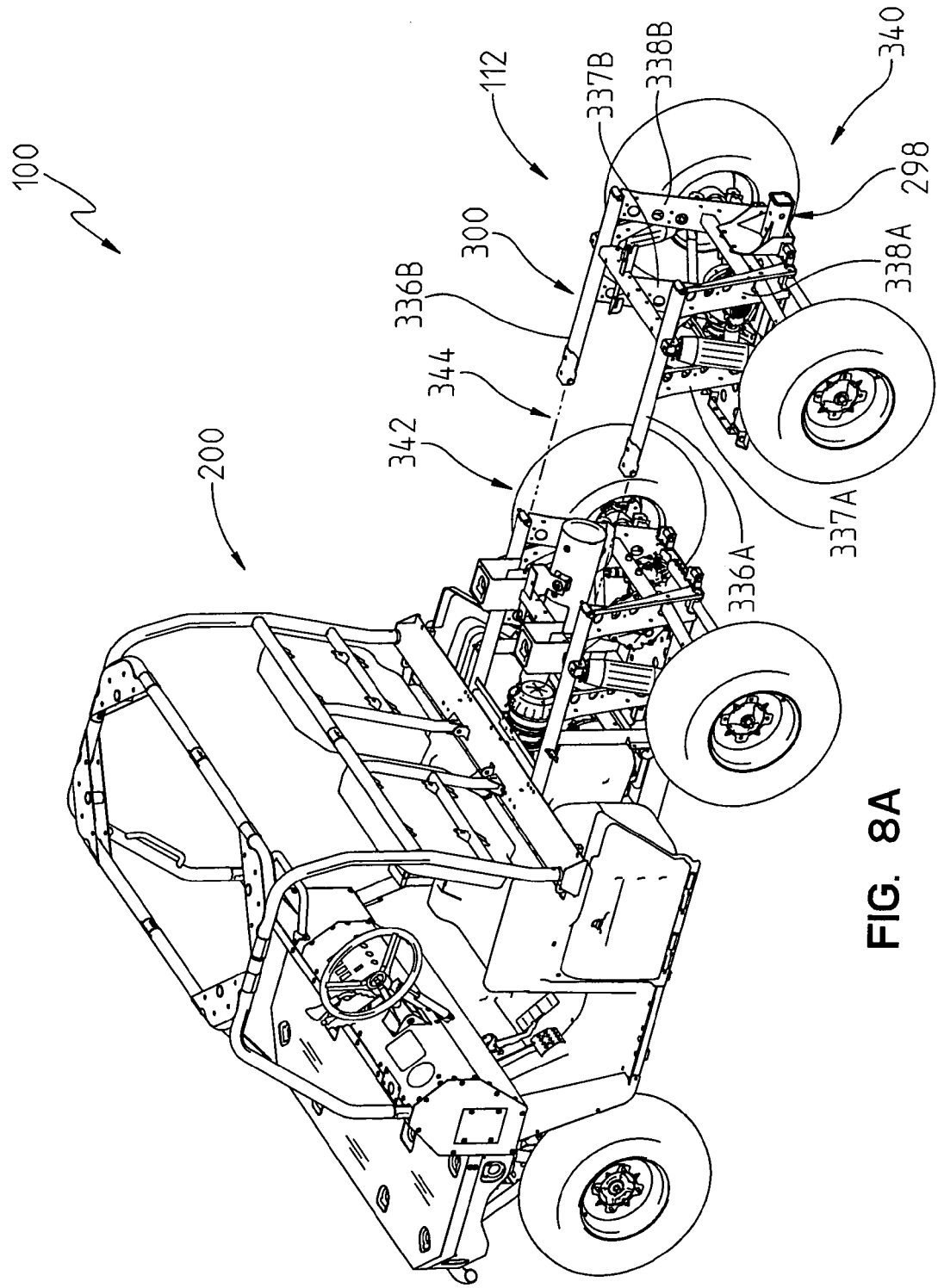
FIG. 8A is a perspective view of the vehicle of FIG. 1 illustrating a base portion comprising a 4×4 and a modular sub-section spaced apart therefrom.
Figure 8B:
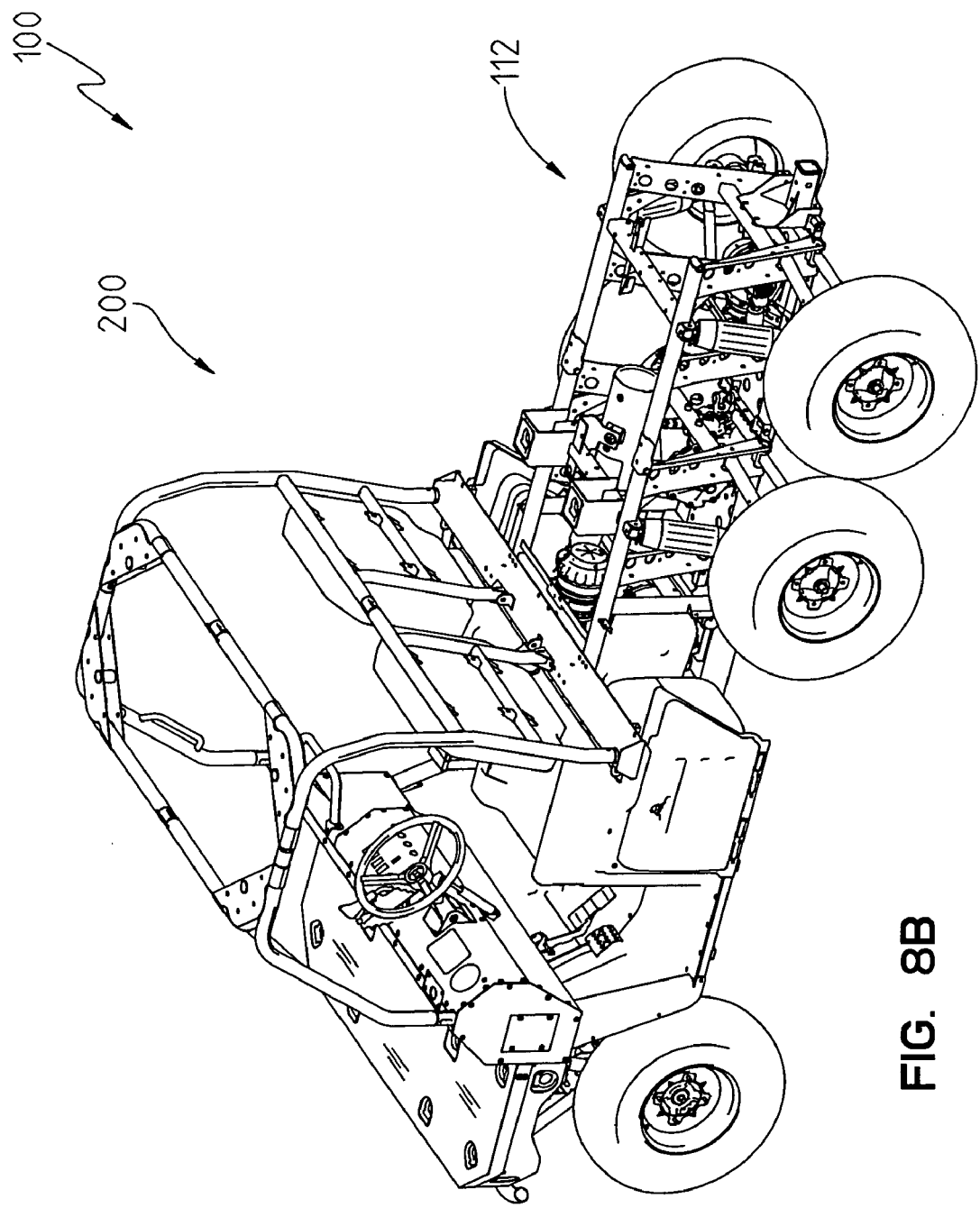
FIG. 8B is the view of FIG. 8A with the modular sub-section coupled to the base portion resulting in a 6×6 vehicle.

Vehicle 100 further includes a frame 104 supported by the plurality of ground engaging members 102. Referring to FIG. 8A, vehicle 100 includes a base portion 200 and a modular subsection 112 including rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more.

Figure 2:
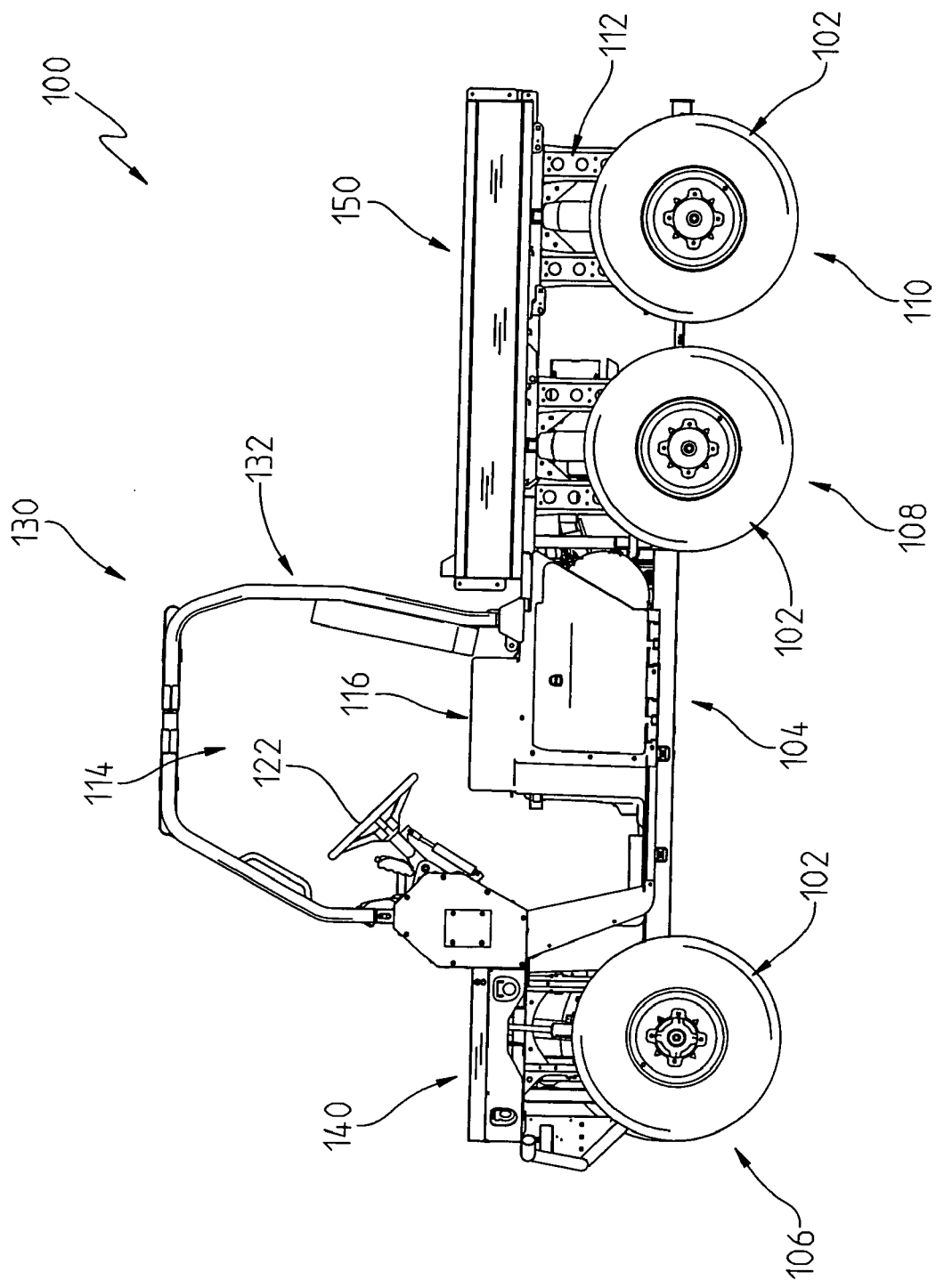
FIG. 2 is a side view of the first side of the vehicle of FIG. 1.
Figure 3:
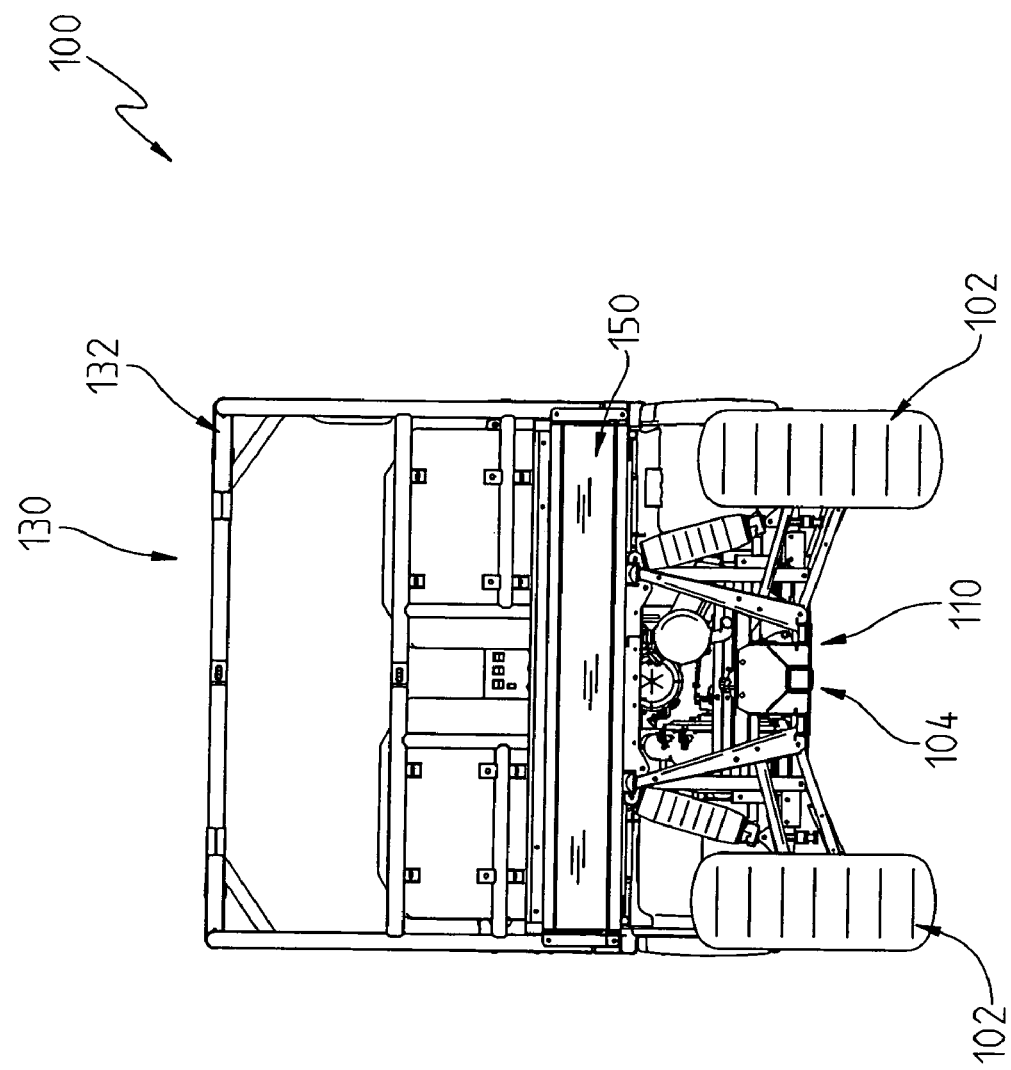
FIG. 3 is a rear view of the vehicle of FIG. 1.
Figure 4:
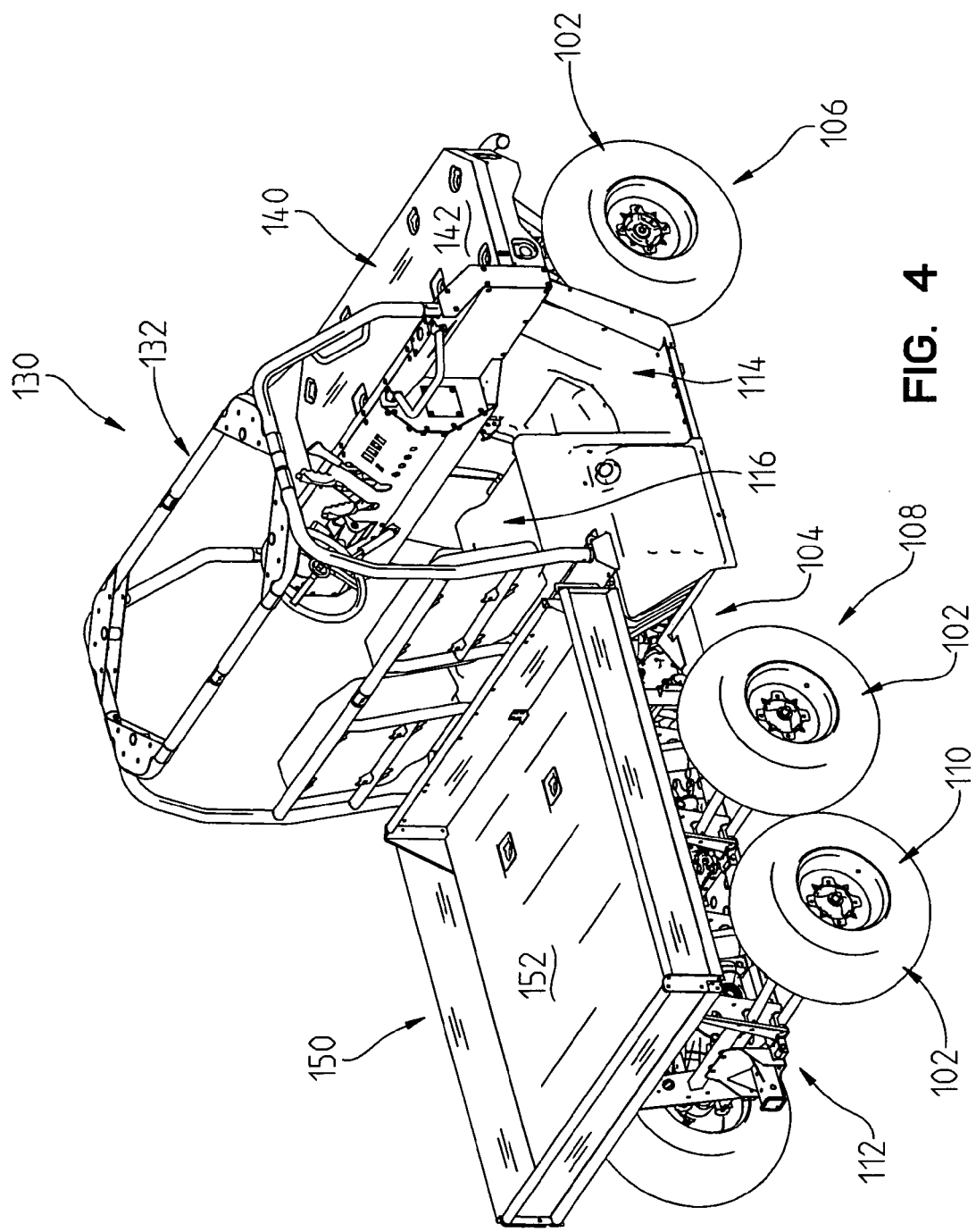
FIG. 4 is a rear, perspective view of the vehicle of FIG. 1 from a second side of the vehicle.

The height of vehicle 100 in FIG. 2 is about 75 inches from the bottom of ground engaging members 102 to the top of roll cage 132.

Vehicle 100 includes an operator area 114 which includes seating 116 for one or more passengers. Operator area 114 further includes a plurality of operator controls 120 by which an operator may provide input into the control of vehicle 100.

Controls 120 include a steering wheel 122 which is rotated by the operator to change the orientation of one or more of ground engaging members 102, such as the wheels associated with front axle 106, to steer vehicle 100. In one embodiment, steering wheel 122 changes the orientation of the wheels of axle 106 and axle 108 to provide four wheel steering. In one embodiment, steering wheel 122 changes the orientation of the wheels of axles 106, 108, and 110 to provide six wheel steering.

Controls 120 also include a first foot pedal 124 actuatable by the operator to control the acceleration and speed of vehicle 100 through the control of an engine 500 described in more detail herein and a second foot pedal 126 actuatable by the operator to decelerate vehicle 100 through a braking system described in more detail herein. Additional details regarding the operator area 114, including controls 120, are provided in U.S. Provisional Application Ser. No. 60/918,556, filed Mar. 16, 2007, titled "VEHICLE", and U.S. Provisional Application Ser. No. 60/918,444, filed Mar. 16, 2007, titled "VEHICLE WITH SPACE UTILIZATION".

Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. Additional details about exemplary configurations of portion 130 are provided in U.S. Provisional Application Ser. No. 60/918,500, filed Mar. 16, 2007, titled "METHOD AND APPARATUS RELATED TO TRANSPORTABILITY OF A VEHICLE".

Vehicle 100 further includes a front platform 140 supported by frame 104 and a rear platform 150 supported by frame 104. Both front platform 140 and rear platform 150 are shown having a support surface 142 and 152, respectively. Support surfaces 142 and 152 may be flat, contoured, and/or comprised of several sections. In addition, one or both of front platform 140 and rear platform 150 may include upstanding walls to define a cargo box extending over at least a portion of the respective platform 140 and 150.

Further, portions of front platform 140 and rear platform 150, along with portion 130 of frame 104, may include devices for attaching various types of assets to vehicle 100. Exemplary assets include cargo containers, seats, gun mounts, footrests, and other suitable assets. Additional details regarding front platform 140 and rear platform 150 are provided in U.S. Provisional Application Ser. No. 60/918,556, filed Mar. 16, 2007, titled "VEHICLE"; U.S. Provisional Application Ser. No. 60/918,444, filed Mar. 16, 2007, titled "VEHICLE WITH SPACE UTILIZATION"; and/or U.S. Provisional Application Ser. No. 60/918,356, filed Mar. 16, 2007, titled "UTILITY VEHICLE HAVING MODULAR COMPONENTS".

Referring to FIG. 8A, vehicle 100 is shown having modular sub-section 112 spaced apart from the remainder or base portion 200 of vehicle 100. As explained in more detail herein the base portion 200 of vehicle 100 includes all of the components required to operate vehicle 100. As such, an operator could remove modular sub-section 112 from the base portion 200 and still have an operational vehicle. Further, as explained in more detail herein modular sub-section 112 may be quickly added to or removed from base portion 200.

Figure 9:
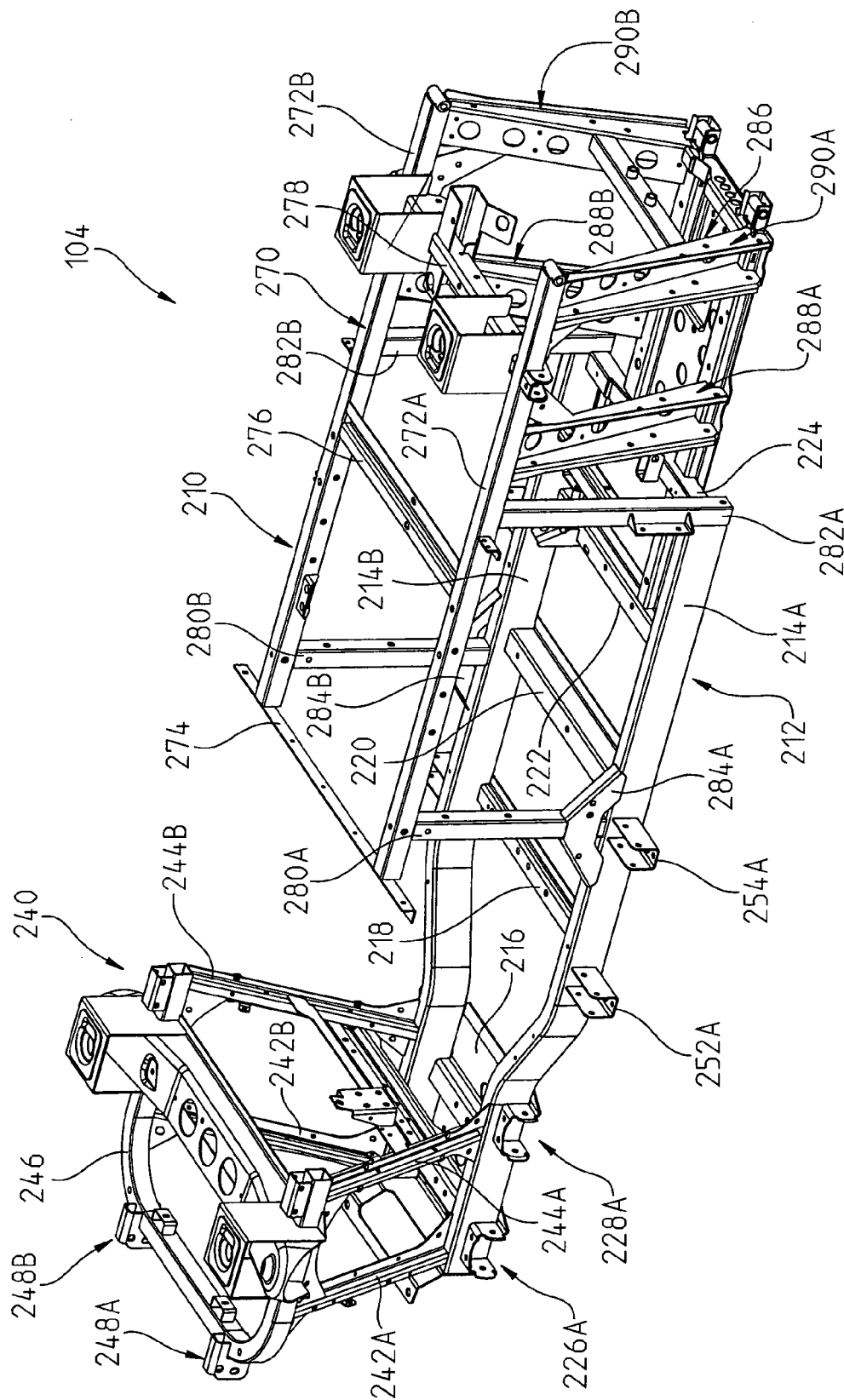
FIG. 9 is a first perspective view of a base frame of the base portion of FIG. 8A.

Referring to FIG. 9, a base frame 210 of frame 104 is shown. Base frame 210 includes a lower frame 212 including a first longitudinal frame member 214A and a second longitudinal frame member 214B. Frame members 214A and 214B are mirror images of each other. Frame members 214A and 214B are coupled together through a front skid plate 216 and cross members 218, 220, 222, and 224. Skid plate 216 and cross members 218, 220, 222, and 224 may be secured to frame members 214A and 214B through any suitable method, such as welding, or by fasteners, such as bolts.

Figure 5:
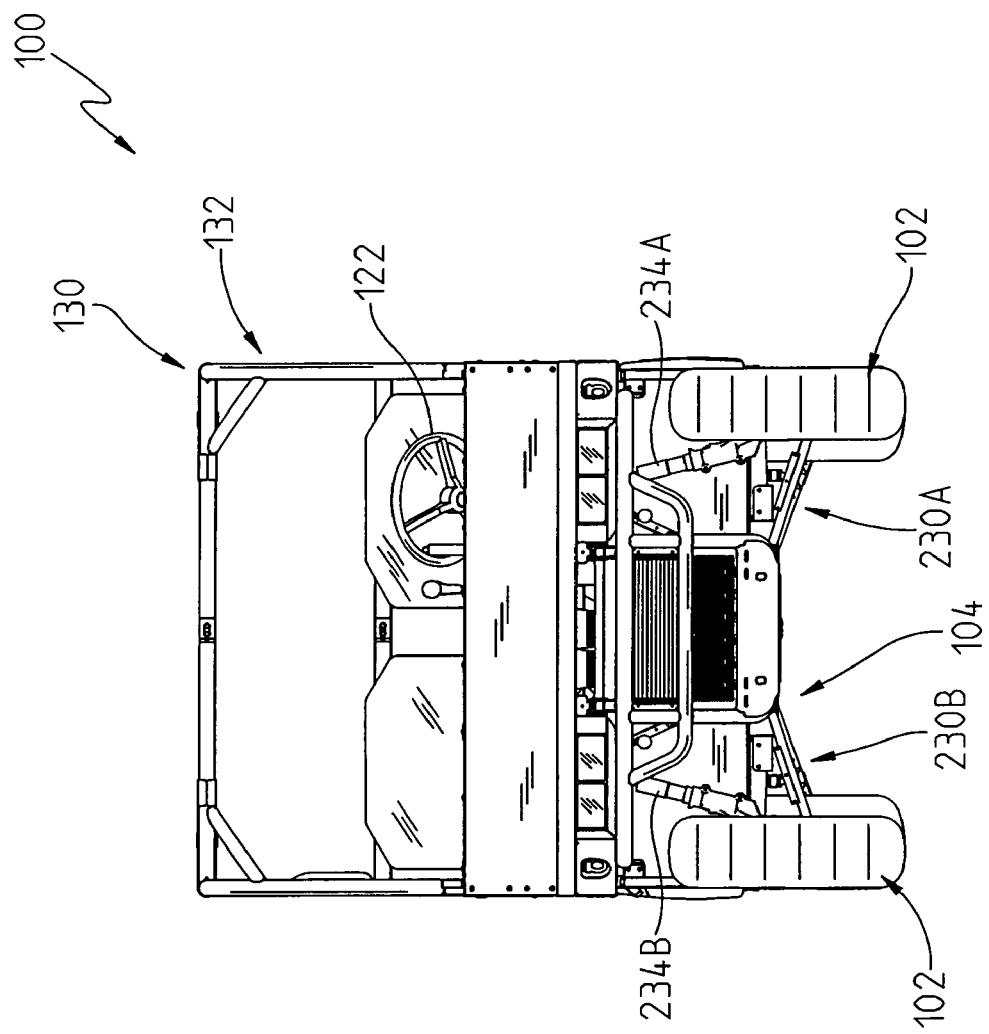
FIG. 5 is a front view of the vehicle of FIG. 1.
Figure 6:
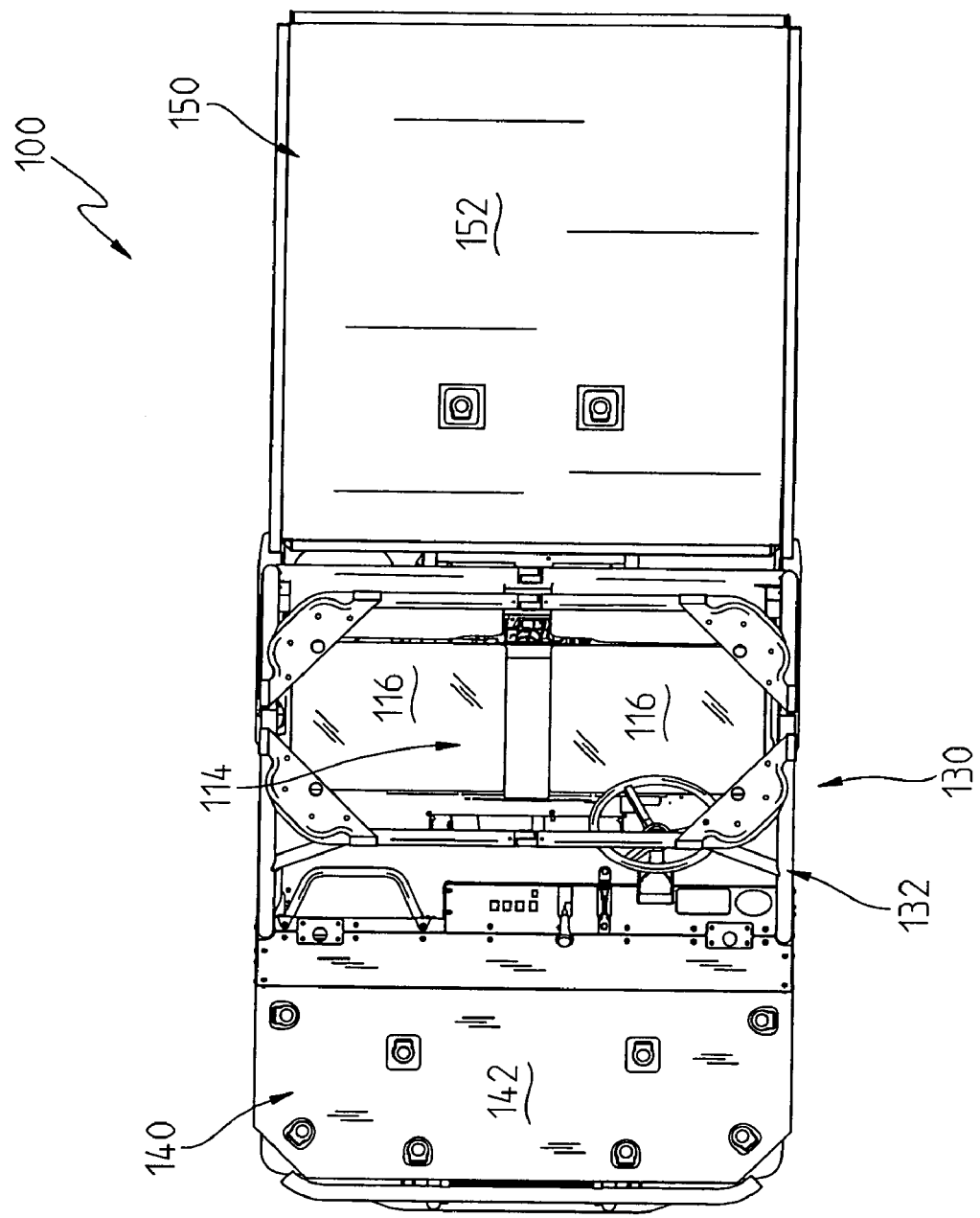
FIG. 6 is a top view of the vehicle of FIG. 1.
Figure 20:
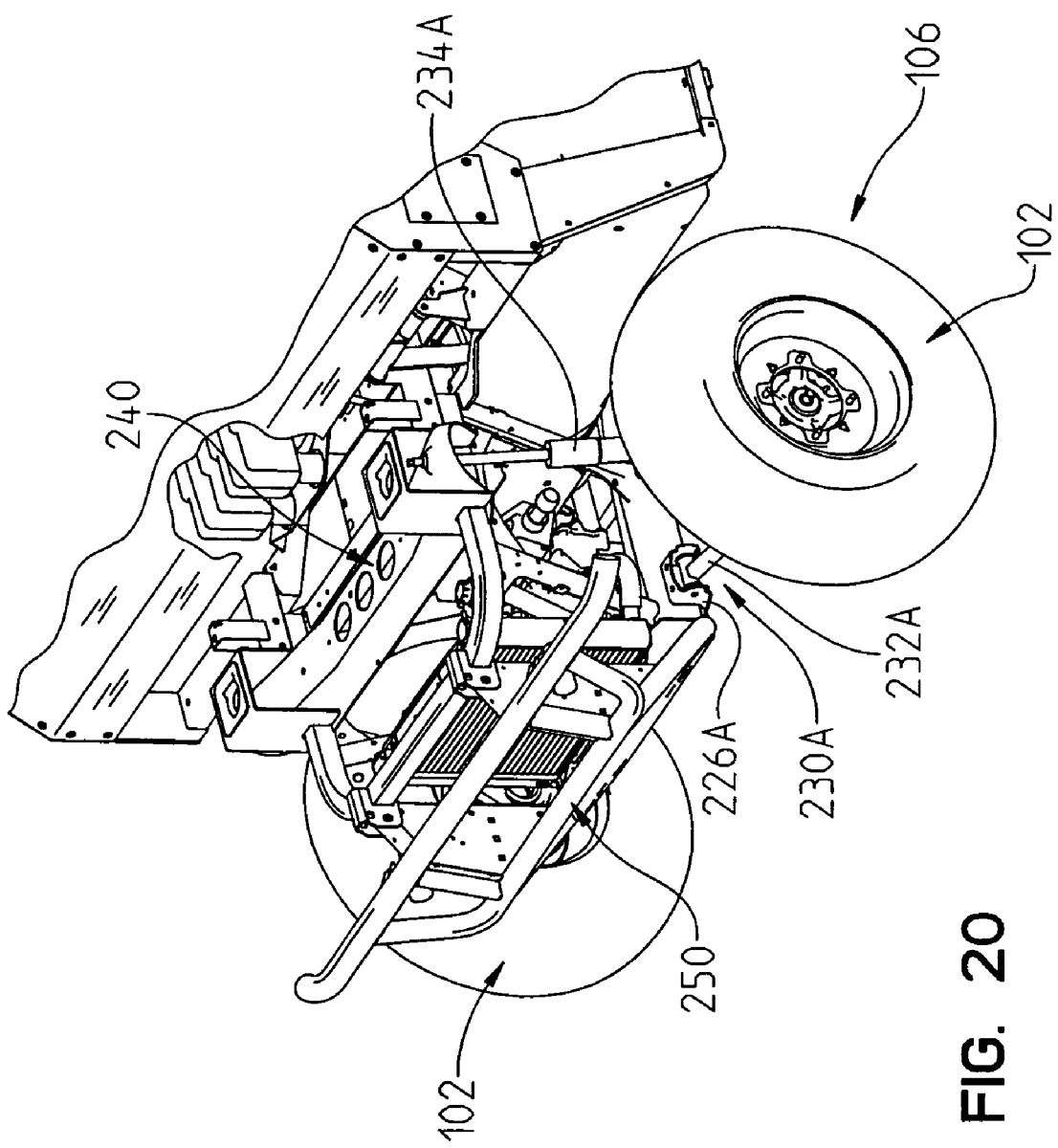
FIG. 20 is a partial front, perspective view of vehicle 100 with the front platform removed.

Attachment locations 226A and 228A are provided in base frame 210 for attaching a front suspension 230A which is in turn coupled to front ground engaging member 102. Illustratively, attachment locations 226A and 228A are provided as apart of skid plate 216. FIGS. 5 and 20 show front suspension 230A including a single A-frame member 232A rotatably coupled to base frame 210 and a shock 234A extending between A-frame member 232A and an upper frame member 240. Suspension 230A is a mirror image of suspension 230B and operates independently thereof. The front ground engaging members 102 of front axle 106 are coupled to steering wheel 122 through a steering assembly, such that ground engaging members 102 may both rotate to the left or right of the straight on position shown in FIG. 5 to change the direction of travel of vehicle 100.

Returning to FIG. 9, an upper frame member 240 is supported by lower frame 212 through a plurality of upwardly-extending frame members 242A, 242B, 244A, and 244B and a generally U-shaped frame member 246. Frame member 246 includes attachment locations 248A and 248B to which a front bumper assembly 250 (see FIG. 20) is attached.

Frame members 214A and 214B also have attachment locations 252 and 254 (252A and 254A shown in FIG. 9) to which an operator cab frame 260 is attached. Operator cab frame 260 includes portion 130 of frame 104. In one embodiment, roll cage 132 of portion 130 is a generally fixed roll cage. In one embodiment, roll cage 132 of portion 130 is a collapsible roll cage. Additional details concerning exemplary collapsible roll cages are provided in U.S. Provisional Application Ser. No. 60/918,500, filed Mar. 16, 2007, titled

"METHOD AND APPARATUS RELATED TO TRANSPORTABILITY OF A VEHICLE".

Base frame 210 further includes a rear upper frame 270 including a first longitudinal frame member 272A and a second longitudinal frame member 272B. Longitudinal frame members 272A and 272B support rear platform 150. Longitudinal frame members 272A and 272B are connected through cross members 274, 276, and 278.

Rear upper frame 270 is coupled to lower frame 212 through upwardly-extending frame members 280A, 280B, 282A, and 282B. Frame members 284A and 284B are provided to assist in maintaining the orientation of frame members 280A and 280B relative to frame members 214A and 214B.

Figure 11A:
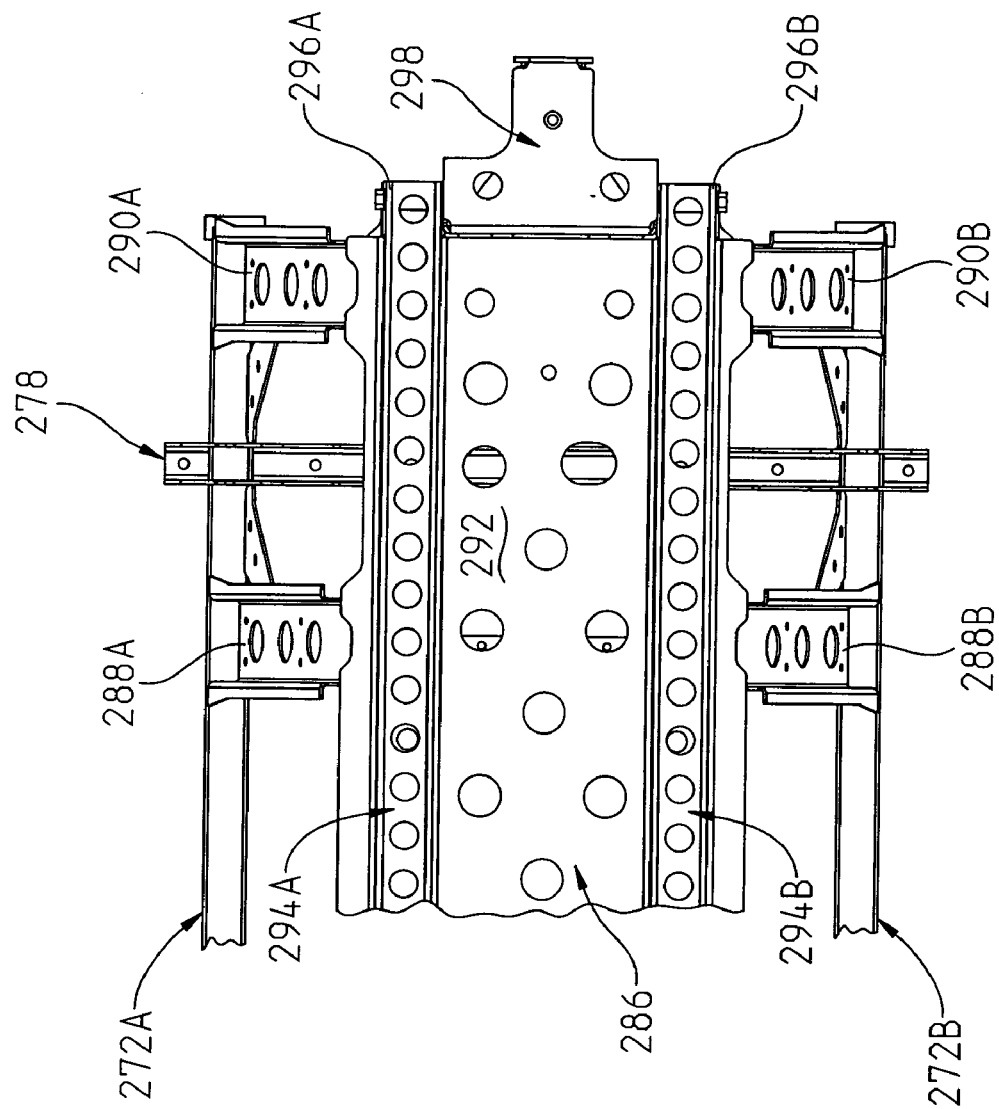
FIG. 11A is a bottom, partial view of the base frame of FIG. 9.
Figure 13A:
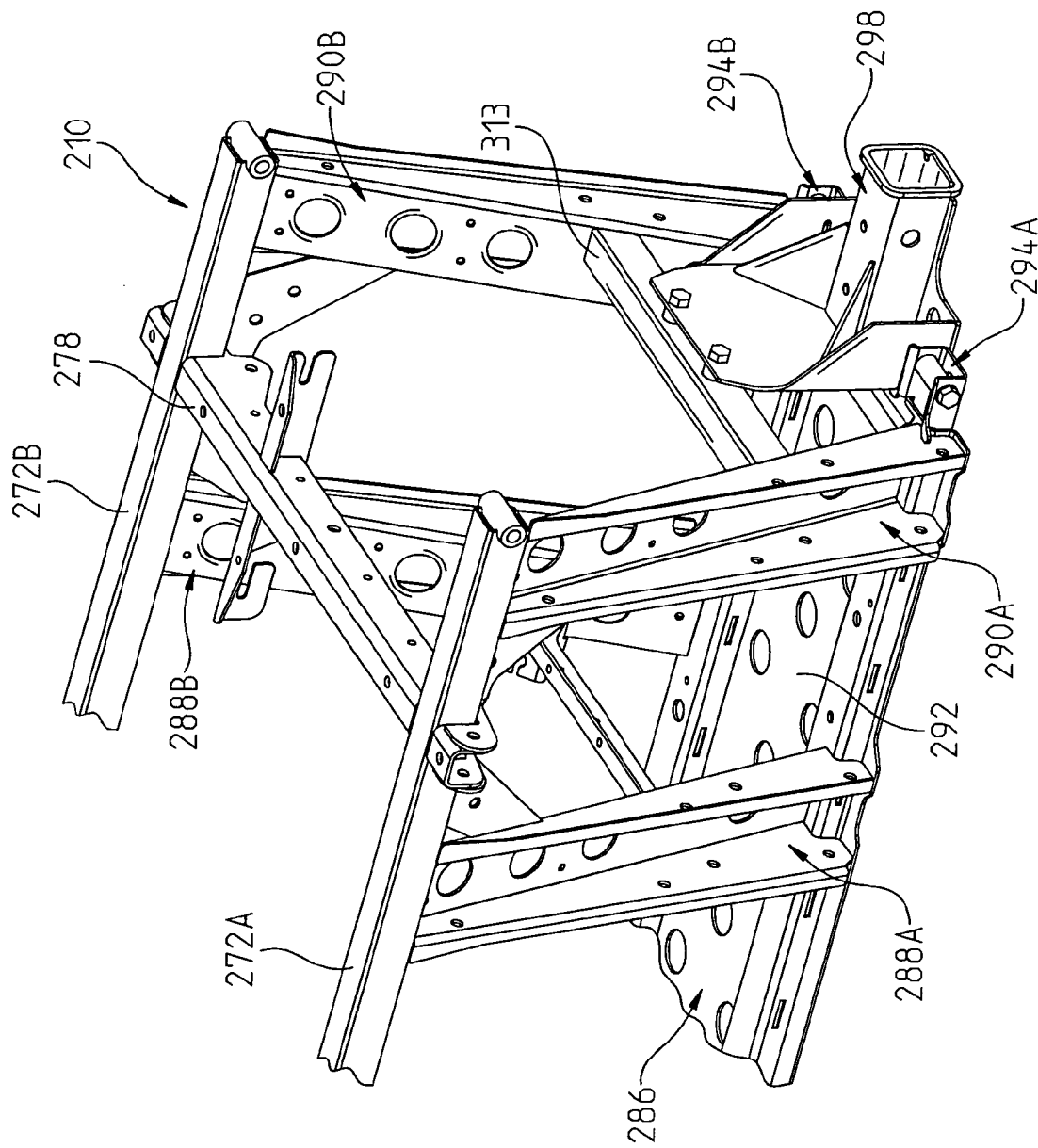
FIG. 13A is a partial, perspective view of the base frame of FIG. 9 with the receiver hitch of FIG. 12 coupled thereto.

Base frame 210 further includes a rear skid plate 286. Referring to FIGS. 11A and 13A, skid plate 286 is coupled to rear upper frame 270 through a plurality of upwardly-extending frame members 288A, 288B, 290A, and 290B. In one embodiment, frame members 288A, 288B, 290A, and 290B directly couple to rear platform 150 as described in U.S. Provisional Application Ser. No. 60/918,356, filed Mar. 16, 2007, titled "UTILITY VEHICLE HAVING MODULAR COMPONENTS".

Skid plate 286 includes a base member 292 and two U-shaped frame members 294A and 294B. Frame members 294A and 294B are received in recesses 296A and 296B of base member 292. Frame members 294A and 294B are coupled to base member 292. In one embodiment, frame members 294A and 294B are welded to base member 292. Each of the members of base frame 210 are coupled to the respective adjacent components of base frame 210. Exemplary types of coupling include welding and fasteners, such as bolts.

As explained in more detail herein, in one embodiment, a receiver hitch 298 is coupled to base frame 210 (shown in FIG. 13A). Further, as explained in more detail herein, in one embodiment, rear skid plate 286 and upper frame members 272A and 272B couple to a modular frame assembly 300 of modular sub-section 112 (shown in FIG. 14) thereby coupling modular sub-section 112 to base portion 200. Conveniently, apertures 322 and 326, in frame members 294A and 294B, respectively, may be used to couple either modular frame assembly 300 or receiver hitch 298.

Figure 12:
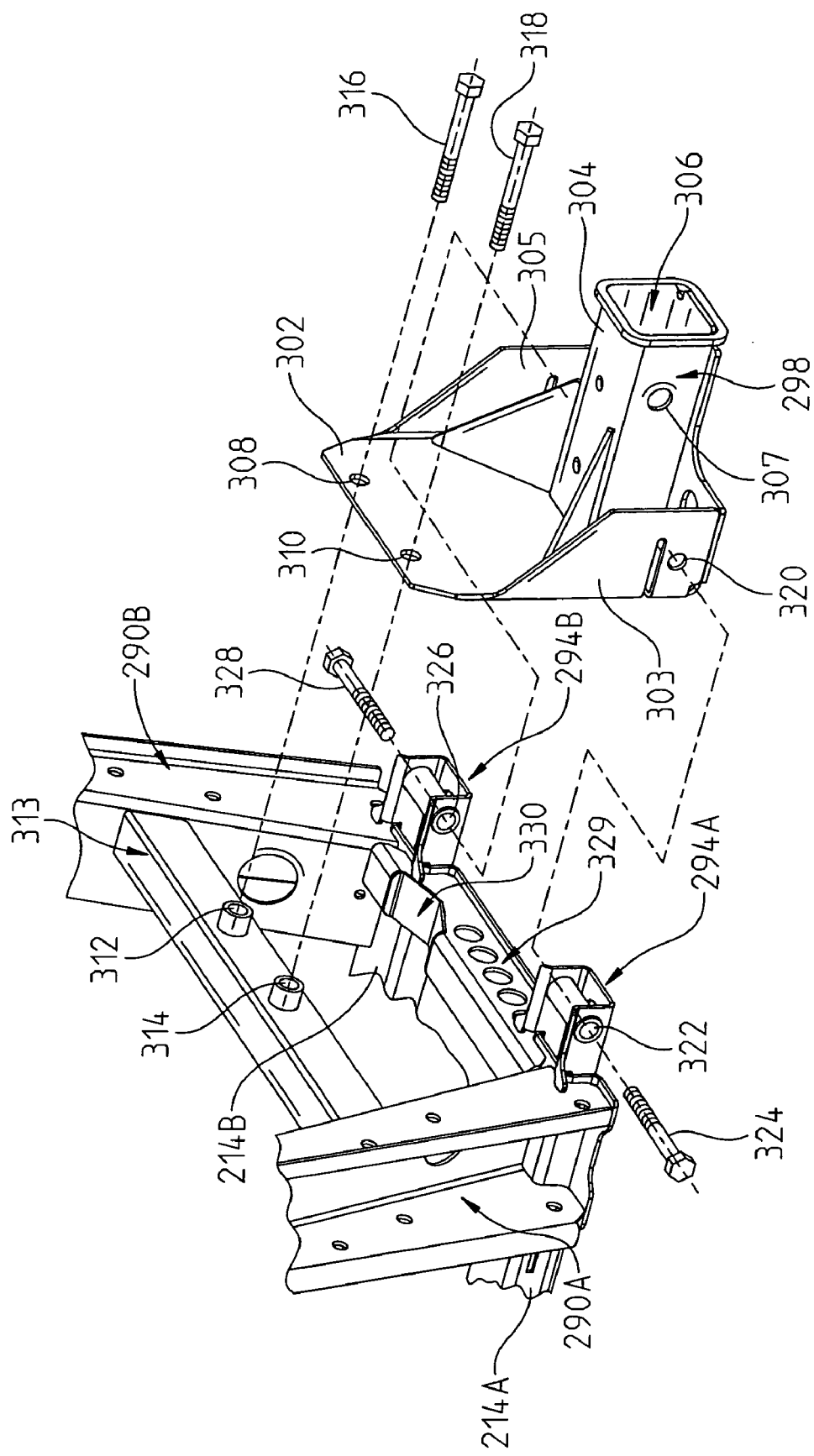
FIG. 12 is an exploded, perspective view of a portion of the base frame of FIG. 9 and a receiver hitch spaced apart therefrom.
Figure 13B:
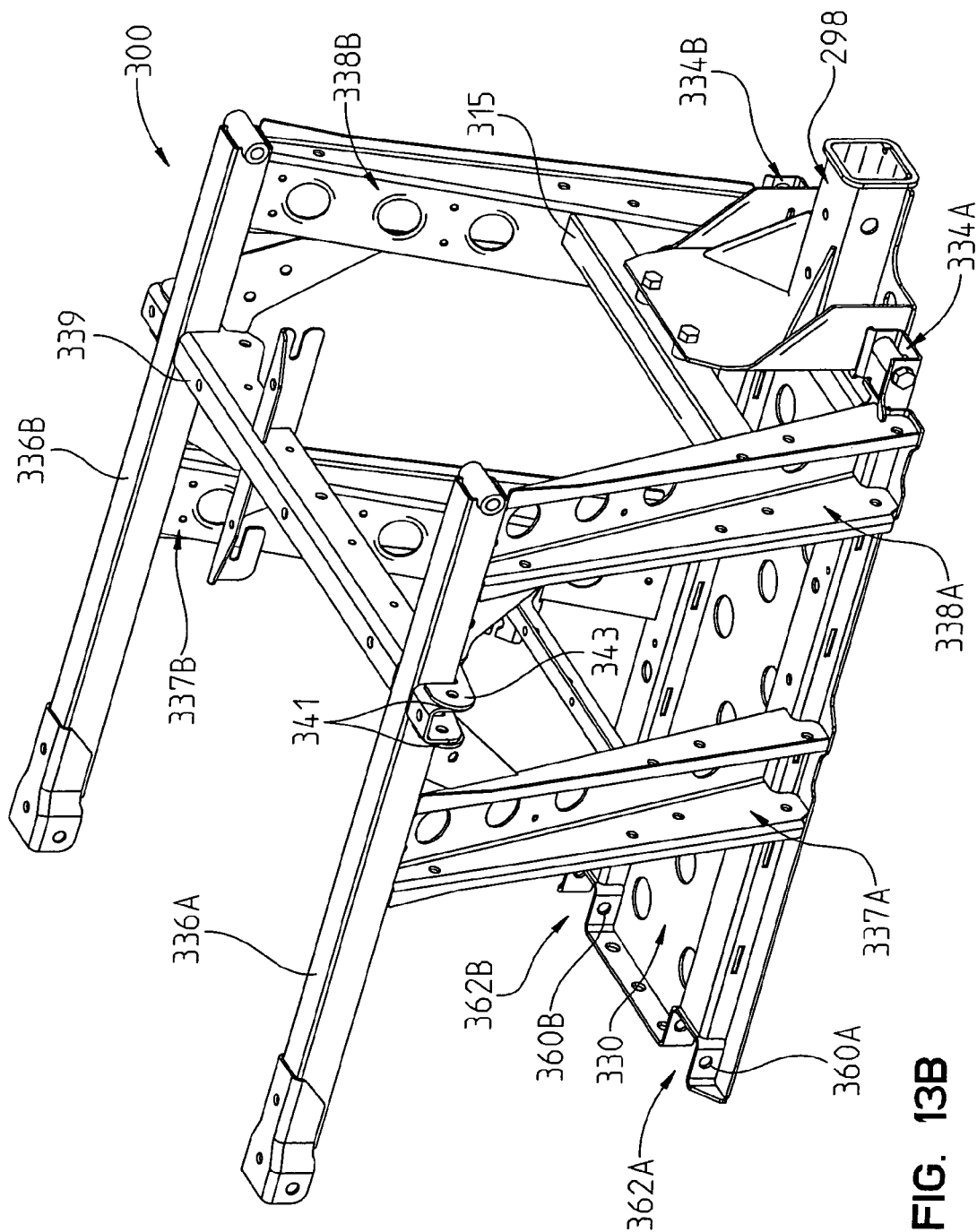
FIG. 13B is a perspective view of the modular frame assembly of modular sub-section of FIG. 11B with the receiver hitch of FIG. 12 coupled thereto.

Referring to FIGS. 12, 13A and 13B, receiver hitch 298 is shown. As shown in FIG. 13A, receiver hitch 298 is coupled to frame members 294A and 294B of skid plate 286 and to a cross frame member 313 spanning between frame members 290A and 290B. As shown in FIG. 13B, receiver hitch 298 is coupled to frame members 334A and 334B of skid plate 330 and to a cross frame member 315 spanning between frame members 338A and 338B.

As shown in FIG. 12, receiver hitch 298 includes a base member 302 and a receiver member 304. Base member 302 includes apertures 308 and 310 in base member 302 and apertures 320 on side wall 303 and a corresponding aperture on side wall 305, respectively. Receiver member 304 includes a recess 306 sized to receive a hitch or other component which may be secured through a fastener passing through aperture 307 of receiver member 304.

Bolts 316 and 318 are received in apertures 308 and 310 of base member 302 and then by apertures 312 and 314, respectively, of cross member 313. Bolts 316 and 318 (and the other bolts discussed herein) are either threaded into mating threads of apertures 312 and 314 (corresponding apertures for other bolts discussed herein) or have corresponding nuts that are tightened. Bolts 324 and 328 are received in apertures 320 and (not shown) in side walls 303 and 305, respectively, and then by apertures 322 and 326 in frame members 294A and 294B, respectively.

Receiver hitch 298 is shown assembled to base frame 210 in FIG. 13. In one embodiment, receiver hitch 298 is disassembled from base frame 210 prior to the attachment of modular sub-section 112 to base frame 210. As explained herein, a rear portion 340 of modular sub-section 112 has the same attachment locations as base frame 210 such that receiver hitch 298 may be easily assembled to the rear of modular sub-section 112 thereby permitting vehicle 100 to still tow a trailer or other item through a hitch. Receiver hitch 298 is shown assembled to modular sub-section 112 in FIG. 13B. In one embodiment, receiver hitch 298 remains assembled to base frame 210 prior to the attachment of modular sub-section 112 to base frame 210 and in one example (see FIG. 15) provides an additional connection point between base frame 210 and modular sub-section 112. Alternatively, the additional connection point between base frame 210 and modular sub-section 112 provided by receiver hitch 298 may replace one or both of the connections between skid plate 330 and frame members 294A and 294B.

Figure 7:
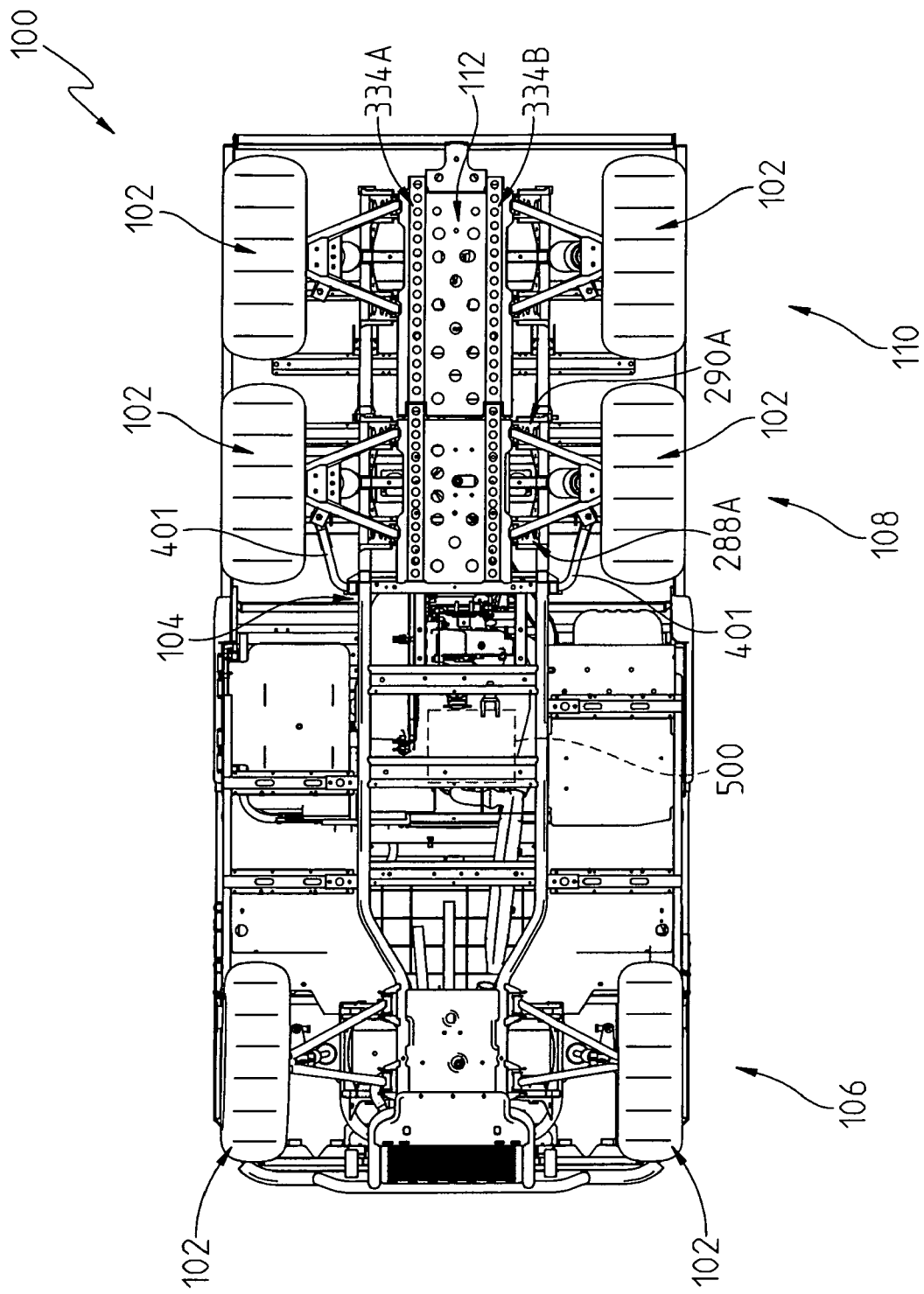
FIG. 7 is a bottom view of the vehicle FIG. 1.

Referring to FIG. 8A, modular sub-section 112 includes a modular frame assembly 300. Modular frame assembly 300 includes a skid plate 330 which is generally identical to skid plate 286. Skid plate 330 includes a base member 332 and two u-shaped members 334A and 334B (see FIG. 7). Modular frame assembly 300 includes two upper frame members 336A and 336B which are attached to skid plate 330 through frame members 337A and 337B and 338A and 338B. Frame members 336A, 336B, 337A, 337B, 338A, and 338B are generally identical to frame members 272A, 272B, 288A, 288B, 290A, and 290B of base frame 210, respectively. A cross member 339 of modular sub-section 112 is generally identical to cross member 278 of base frame 210. As stated herein, one or more of such modular sub-sections may not include a drive unit, such as a modular differential 524. As such, in one embodiment, a given axle may be non-powered and located between two powered axles or adjacent a powered axle and a non-powered axle.

As shown in FIG. 13B, cross member 339 includes a thickened portion 341 formed by coupling gussets 343 to cross member 339. The thickened portion 341 provides additional strength to cross member 339 which as discussed herein provides the upper mount for suspension systems 450A and 450B. A similar thickened portion is included on cross member 278 of base frame 210.

Rear portion 340 of modular sub-section 112 is generally identical to a rear portion 342 of base frame 210 and a front portion 344 of modular sub-section is configured to be coupled to rear portion 342 of base frame 210. Since rear portion 340 is generally identical to rear portion 342, a second modular sub-section 112 may be assembled to rear portion 340 of the first modular sub-section. Still further a third modular sub-section 112 may be assembled to rear portion 340 of the second modular sub-section and so forth thereby creating an 8×8 vehicle, a 10×10 vehicle, and so forth.

Figure 11B:
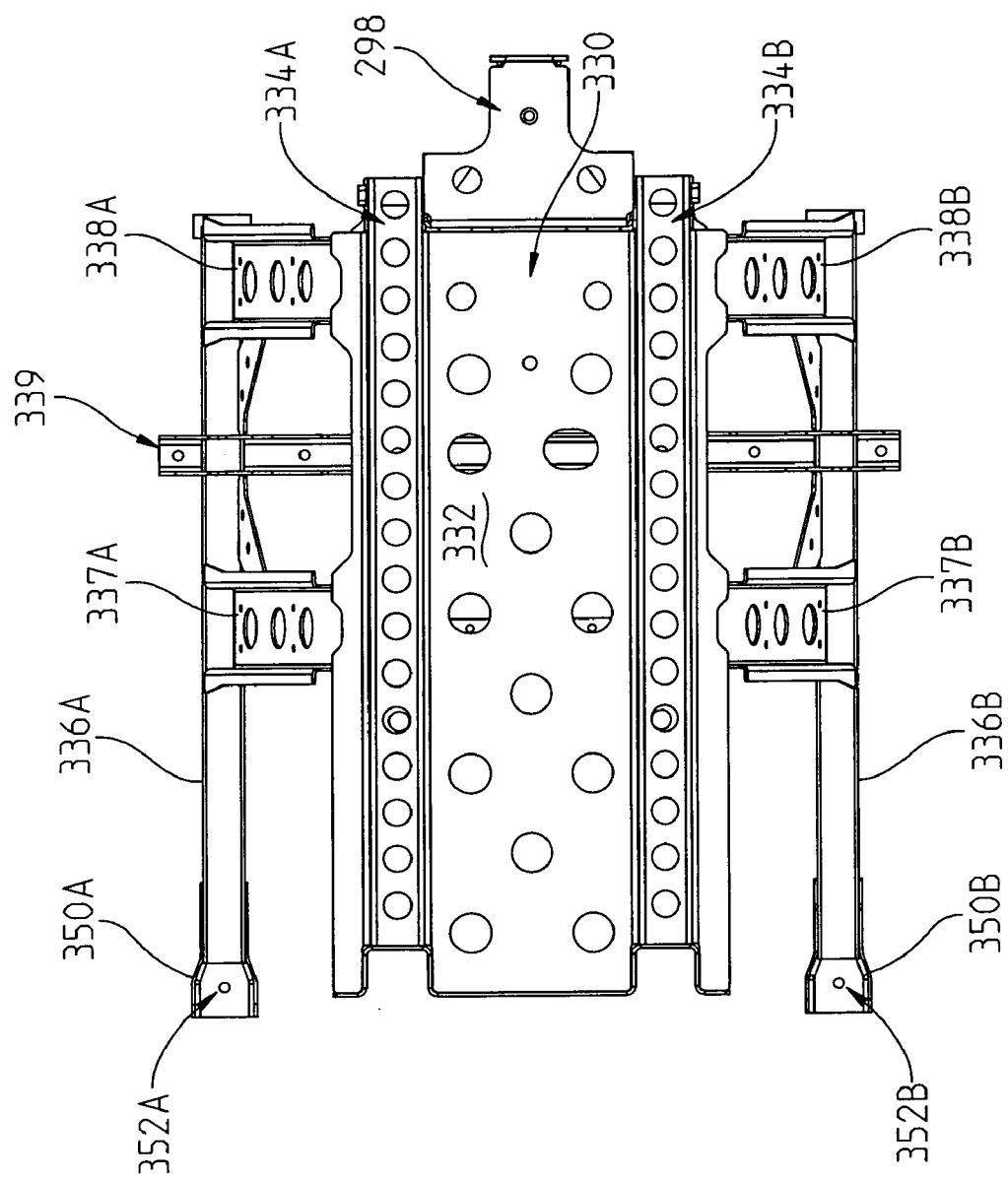
FIG. 11B is a bottom view of a modular frame assembly of the modular sub-section of FIG. 8A.
Figure 14:
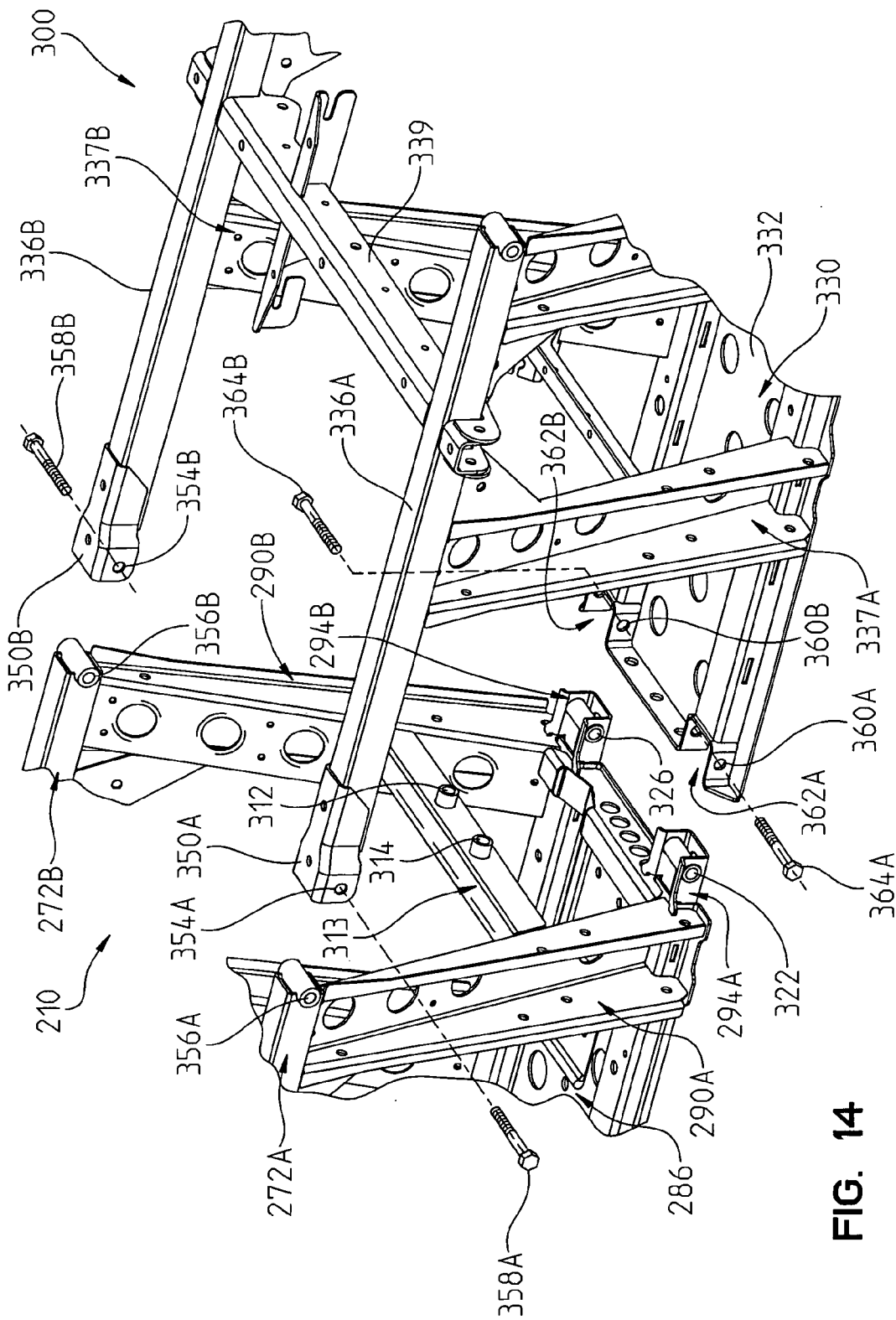
FIG. 14 is a partial perspective view of the base frame of FIG. 9 and the modular frame assembly of modular sub-section of FIG. 11B illustrating the frame connections between the two.

Referring to FIG. 14, the frame connections between rear portion 342 of base frame 210 and front portion 344 of modular sub-section 112 are shown. Receiver hitch 298 is disassembled from base frame 210 prior to the assembly of modular frame assembly 300. Upper frame members 336A and 336B each have coupled thereto a unshaped receiver 350A and 350B. Receivers 350A and 350B each include a recess 352A and 352B (see FIG. 11B). Receivers 350A and 350B each further include apertures 354A and 354B which align with apertures 356A and 356B in base frame 210 to receive bolts 358A and 358B.

Skid plate 330 of modular base frame 300 includes apertures 360A and 360B which are formed on side walls of recesses 362A and 362B, respectively. Recesses 362A and 362B are sized to receive frame members 294A and 294B, respectively. Frame members 294A and 294B are advanced into recesses 362A and 362B until apertures 322 and 326 in frame members 294A and 294B are aligned with apertures 360A and 360B of modular base frame 300, respectively. Bolts 364A and 364B couple skid plate 330 and frame members 294A and 294B together.

Figure 10:
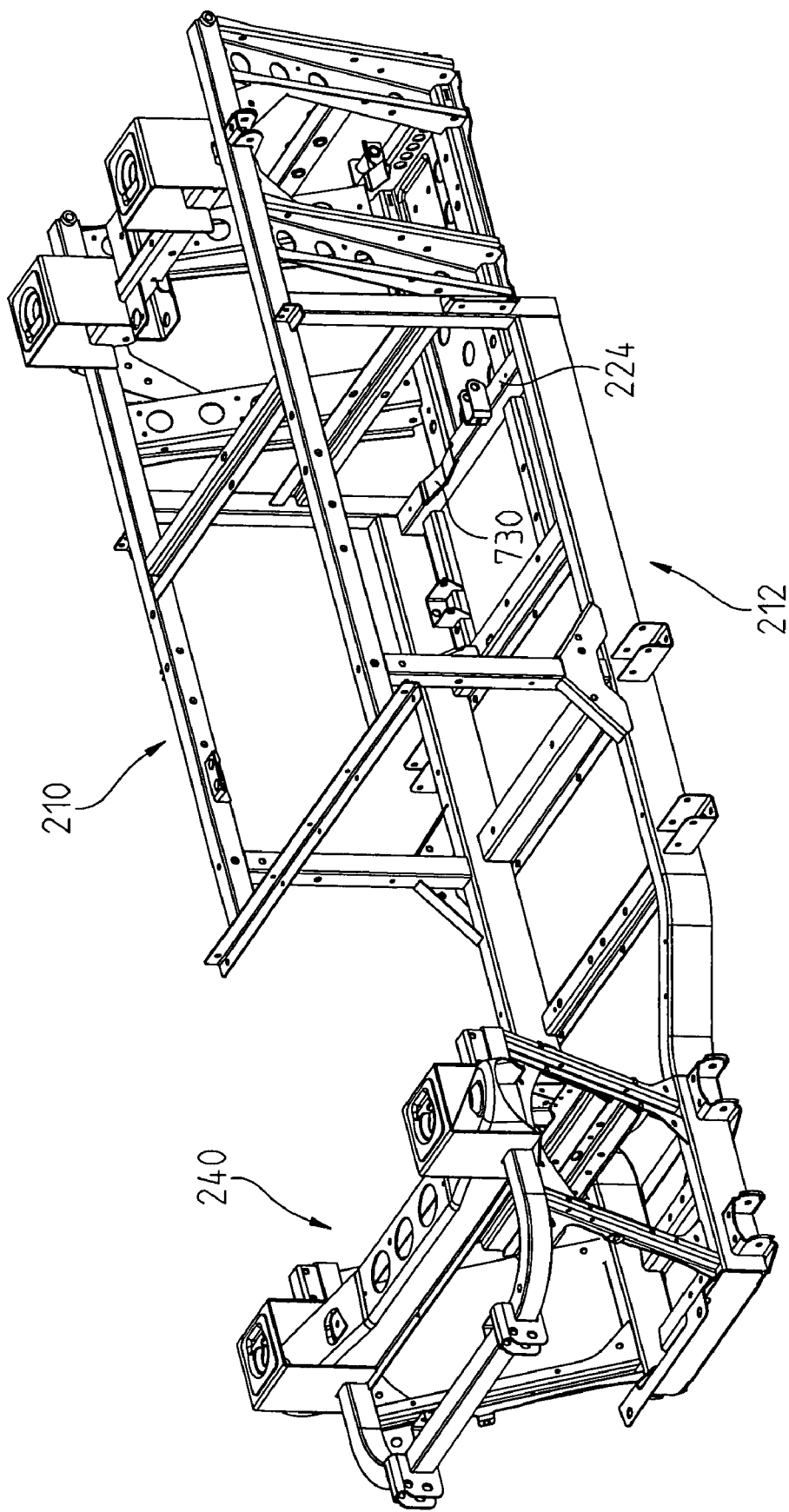
FIG. 10 is a second perspective view of the base frame of FIG. 9.

Although the above discussion is related to the assembly of modular frame assembly 300 to base frame 210, it should be understood that it is contemplated to couple a complete modular subsection 112 (such as shown in FIG. 10) to a complete base portion 200 (such as shown in FIG. 10). Therefore, a complete modular section 112 may be added or removed to base portion 200 through four frame connections. Although not shown in FIG. 10, it is contemplated, in one embodiment, that each of base portion 200 and modular subsection 112 include a rear platform 150. Additional details regarding exemplary rear platforms are provided in U.S. Provisional Application Ser. No. 60/918,356, filed Mar. 16, 2007, titled "UTILITY VEHICLE HAVING MODULAR COMPONENTS".

Modular frame assembly 300 may be assembled to base frame 210 in the following manner. Receivers 350A and 350B are placed on top of upper frame members 272A and 272B of base frame 210. Apertures 354A and 354B of receivers 350A and 350B are aligned with apertures 356A and 356B of upper frame members 272A and 272B, respectively. Bolts 358A and 358B are passed through the respective apertures and secured to the assembly. Modular frame assembly 300 is then rotated downward and frame members 294A and 294B are further advanced into recesses 362A and 362B until apertures 360A and 322 and apertures 360B and 326 are aligned. Bolts 364A and 364B are passed through the respective apertures and secured to the assembly completing the assembly of modular frame assembly 300 to base frame 210.

In one embodiment, in addition to the frame connections, an additional connection is made through drive shaft 523 and an electrical harness connected to differential 522. In one embodiment, drive shaft 523 is coupled to one of differential 520 and 522 through a spline coupling. As such, when modular subsection 112 is spaced apart from base portion 200, the spline coupling disconnects. The electrical harness connected to differential 522 includes a plug connection that may be disconnected to unhook modular subsection 112. The electrical harness connects differential 522 to ECM 510 which electronically configures differential 522 in either a locked configuration relative to output shaft 534A and 534B or an unlocked configuration relative to output shaft 534A and 534B. In one embodiment, when ECM 510 detects that parking brake 700 has been set, differential 520 and/or differential 522 are set to the locked configuration.

In one embodiment, rear platform 150 includes additional connections between base portion 200 and modular subsection 112 that need to be disconnected in order to separate modular subsection 112 from base portion 200. Additional details of exemplary rear platform connections are provided in U.S. Provisional Application Ser. No. 60/918,356, filed Mar. 16, 2007, titled "UTILITY VEHICLE HAVING MODULAR COMPONENTS".

Figure 15A:
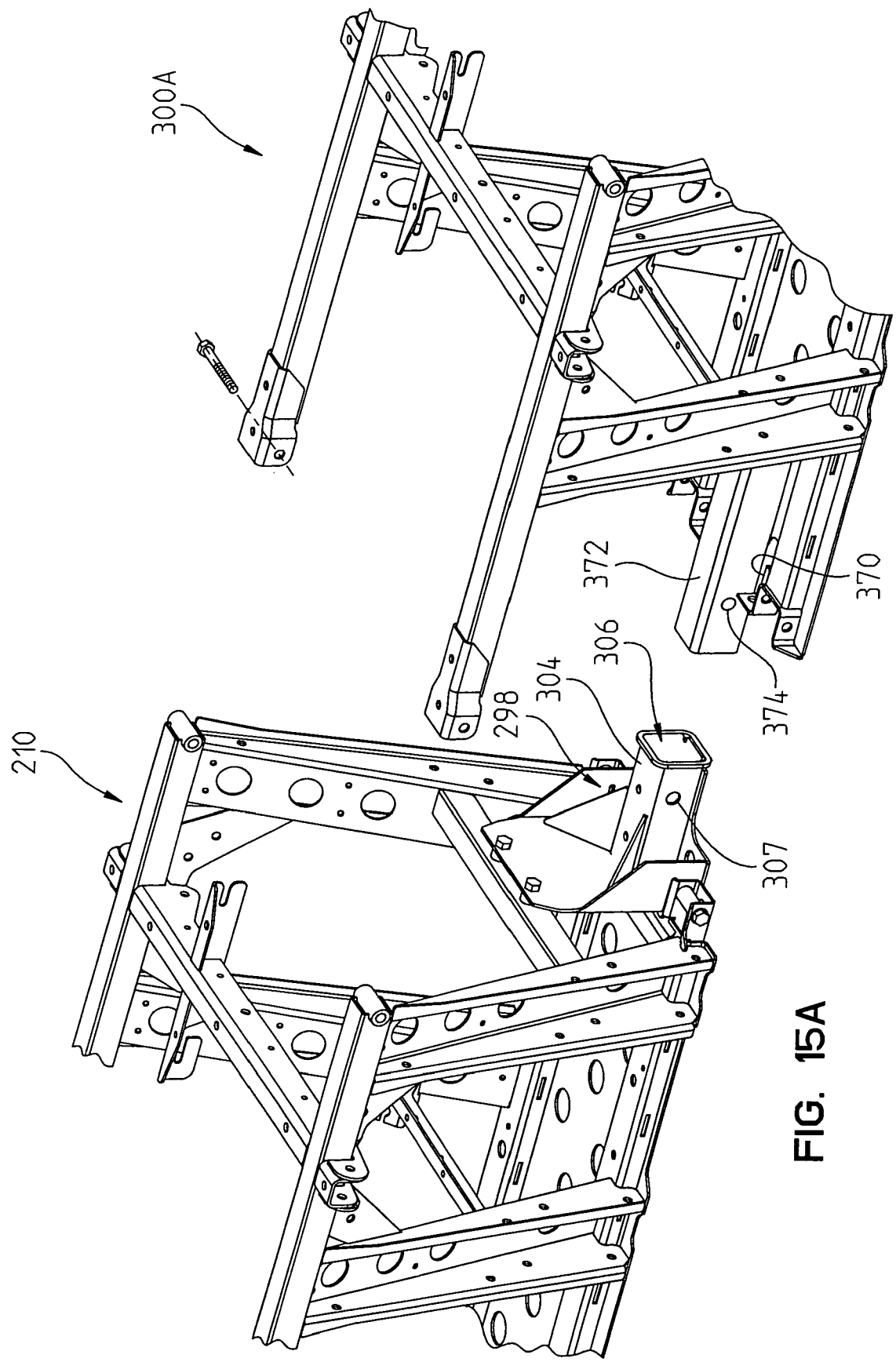
FIG. 15A is a partial perspective view of the base frame of FIG. 9 and the modular frame assembly of modular sub-section of FIG. 11B modified to illustrate the frame connections between the two including a connection by the receiver hitch coupled to the base frame of FIG. 9.

Referring to FIG. 15A, a second embodiment of the frame connections between base frame 210 having assembled thereto a receiver hitch 298 and a modified version of modular base frame 300'. Modular base frame 300' is generally identical to modular base frame 300 with the exception that skid plate 330' includes a recess 370 to receive portion 304 of receiver hitch 298 and a hitch member 372 is coupled to skid plate 330'. Hitch member 372 is received within recess 306 of receiver hitch 298. A bolt or pin is passed through aperture 307 of receiver hitch 298 and aperture 374 of hitch 372 to couple hitch member 372 to receiver hitch 298.

Figure 15B:
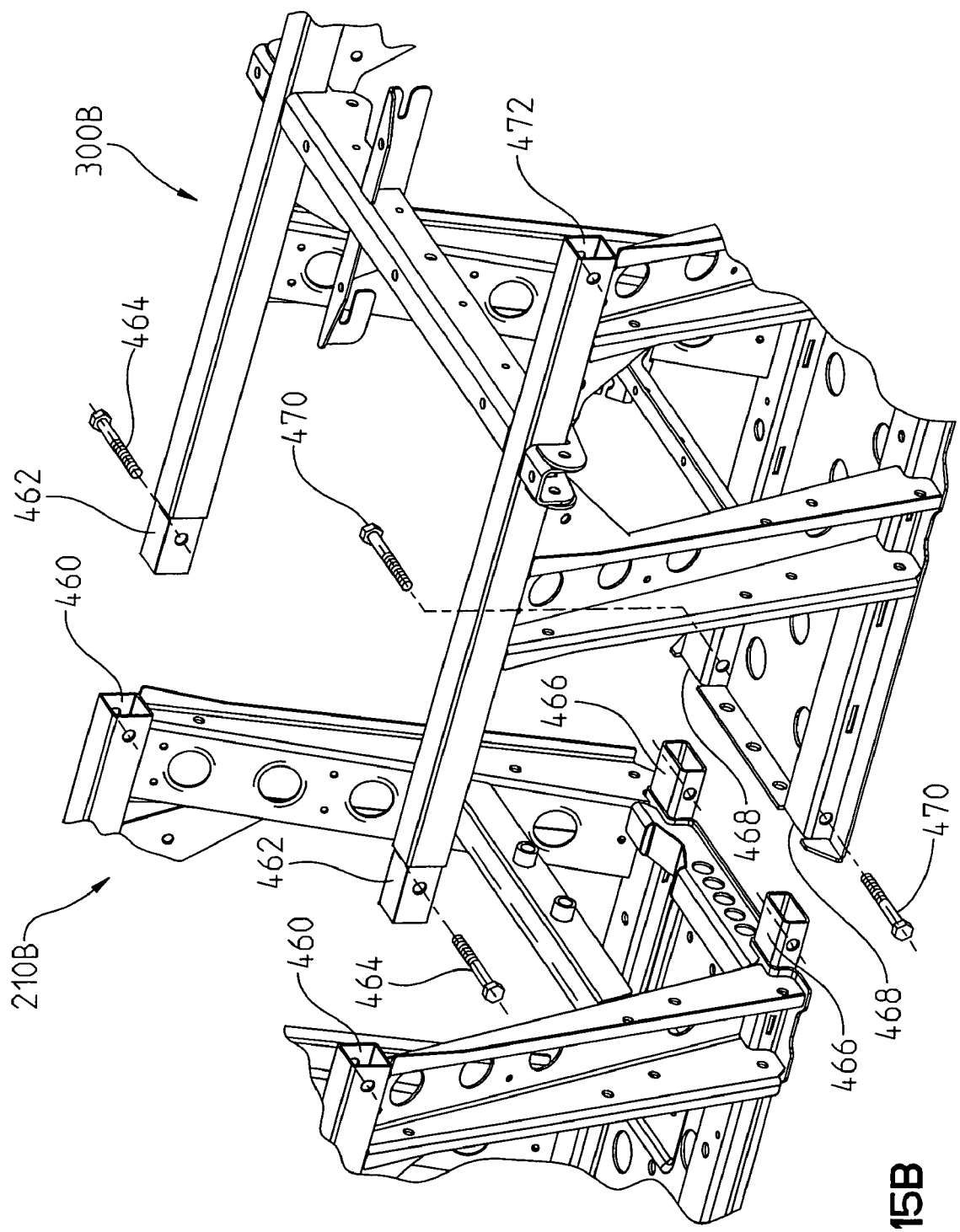
FIG. 15B is a partial perspective view of the base frame of FIG. 9 and the modular frame assembly of modular sub-section of FIG. 11B modified to illustrate another embodiment of the frame connections between the two.

Referring to FIG. 15B, an alternative embodiment is shown of the frame connections between a modified base frame 210 and a modified modular base frame 300. Base frame 210B and modular base frame 300B are generally identical to base frame 210 and modular base frame 300, respectively, except for the connectors that couple base frame 210B and modular base frame 300B. Receivers 350A and 350B and apertures 356A and 356B are replaced with male coupling portions 462 and receivers 460. Receivers 460 receive male coupling portions 462. Bolts 464 or pins are passed through apertures in male coupling portions 462 and the upper frame members which comprise receivers 460 to secure the upper two couplings. Similarly, receivers 468 receive male coupling portions 466. Bolts 470 or pins are passed through apertures in male coupling portions 466 and the frame members which comprise receivers 468 to secure the lower two couplings.

Figure 18:
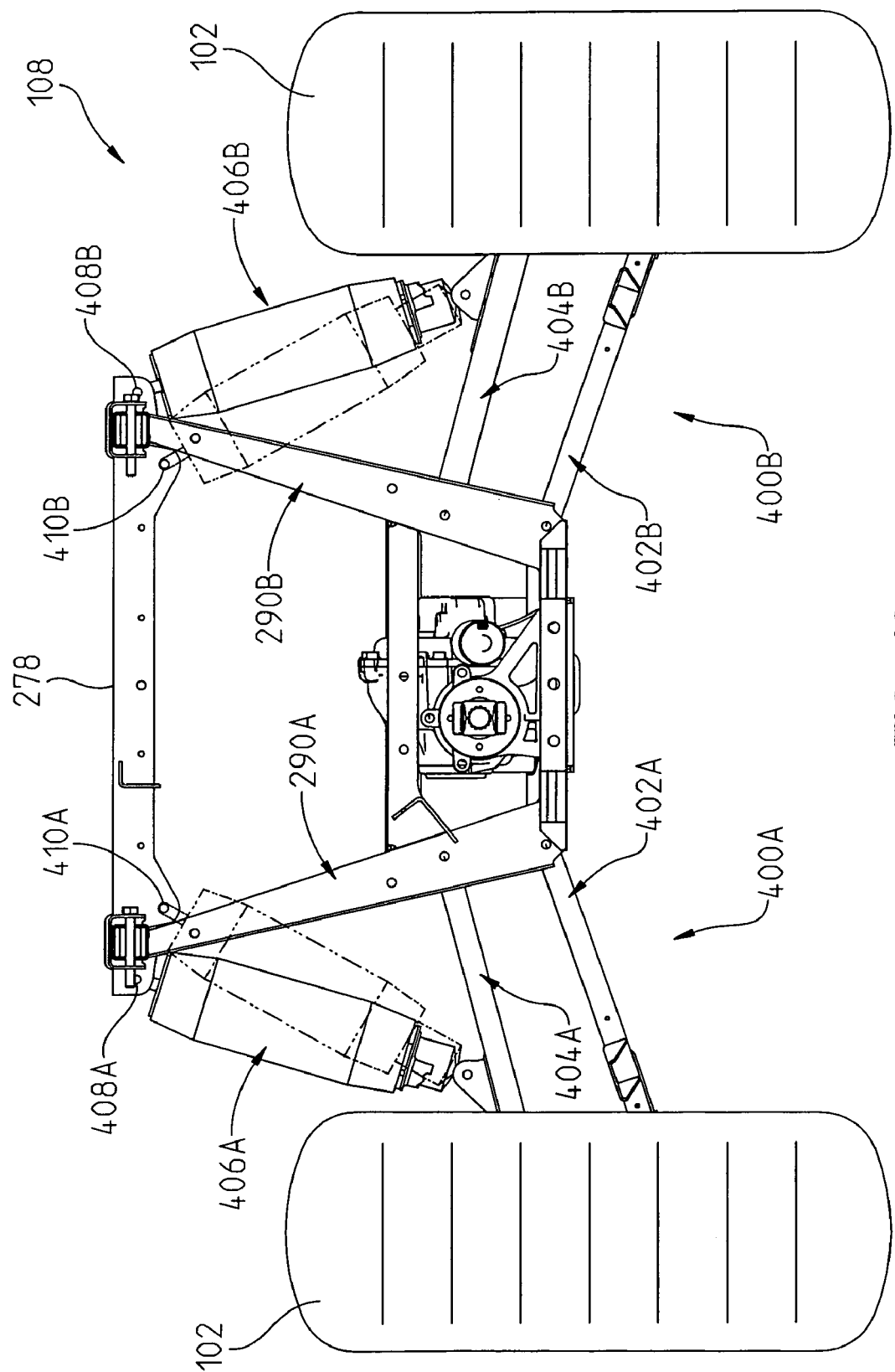
FIG. 18 is a rear view of the base frame of FIG. 9 and the location of shocks extending between a cross member of base frame and a suspension member.

Referring to FIG. 18, the wheels of mid axle 108 are coupled to base frame 210 through suspension systems 400A and 400B which are mirror images of each other. Suspension system 400A includes a lower A-frame member 402A and an upper A-frame member 404A, each connected to ground engaging member 102 and to frame members 288A and 290A (see FIG. 7). Suspension system 400A further includes a shock member 406A. Exemplary shock members 406A include springs and gas shocks.

Shock member 406A is coupled at a first end to frame member 404A of suspension system 400A and at a second end to frame member 278 of base frame 210. Each end of frame member 278 includes a first attachment location 408A and a second attachment location 410A inward relative to first attachment location 408A. Shock member 406A may be coupled to either first attachment location 408A or second attachment location 410A.

Shock member 406A is coupled to first attachment location 408A to provide a stiffer ride and more stability. By moving shock absorber to second attachment location 410A, suspension system 400A provides a softer ride. Suspension systems 400A and 400B are independent suspensions. In one embodiment, a torsion bar 401 (see FIG. 7) couples to base frame 210 and suspension systems 400A and 400B and generally couples the movement of suspension system 400A and suspension system 400B together.

Modular subsection 112 includes suspension systems 450A and 450B which are generally identical to suspensions 400A and 400B of base portion 200. As such, vehicle 100 in its base configuration is a four wheeled vehicle having four wheel independent suspension and in the configuration shown in FIG. 1 is a six wheeled vehicle having six wheel independent suspension.

By having suspensions 450A and 450B be identical to suspensions 400A and 400B, if a component of one of suspensions 400A or 400B fails, an operator of vehicle 100 may disconnect modular subsection 112 and use the corresponding component from one of suspensions 450A and 450B to replace the failed component of the respective suspension 400A and 400B. In a similar fashion ground engaging members 102 are identical and may be assembled at any location.

As such, modular subsection 112 in addition to other features provides on demand spare components for base portion 200.

Referring to FIG. 2, base frame 210 and/or modular frame 300 are configured such that axle 110 carries less of the weight distribution than axle 108. In one embodiment, axle 108 carries about 65% of the weight plus or minus about 20%.

Figure 19:
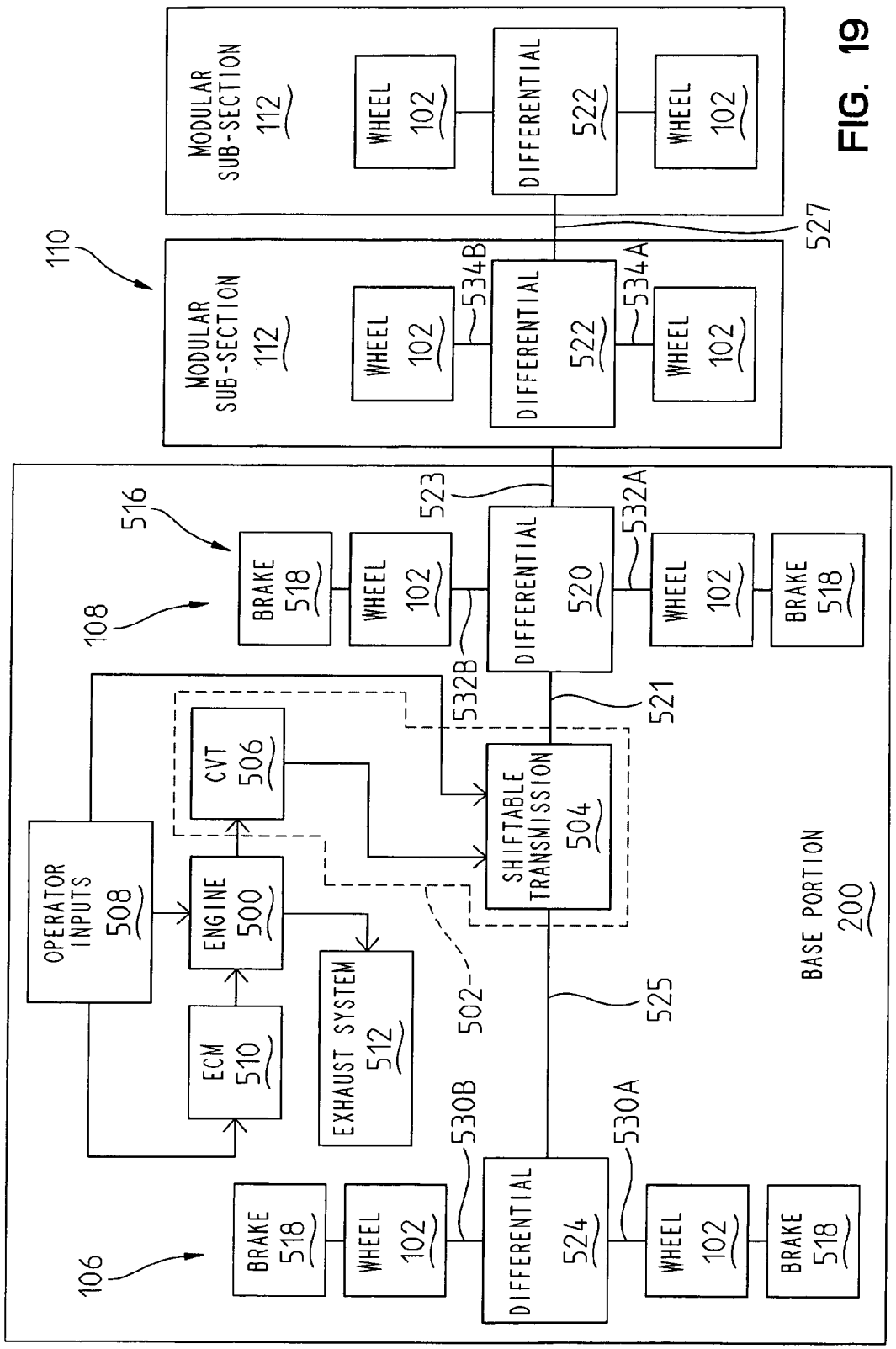
FIG. 19 is a diagrammatic representation of vehicle 100.

As mentioned earlier base portion 200 includes the components for a functional four by four vehicle. Referring to FIG. 19, base portion 200 includes an engine 500 to power base portion 200 and a transmission 502 coupled to engine 500. In one embodiment, engine 500 is a multifuel engine capable of utilizing various fuels. Exemplary engines are disclosed in U.S. patent application Ser. No. 11/445,731, filed Jun. 2, 2006, the disclosure of which is expressly incorporated by reference herein. In one embodiment, engine 500 is a hybrid electric engine. In one embodiment, engine 500 is a hybrid electric drive engine.

In one embodiment, transmission 502 includes a shiftable transmission 504 and a continuously variable transmission ("CVT") 506. CVT 506 is coupled to engine 500 and shiftable transmission 504. Shiftable transmission 504 is coupled to drive shaft 525 coupled to front differential 524 and to drive shaft 521 coupled to rear differential 520.

Shiftable transmission 504 is shiftable between a high gear for normal forward driving, a low gear for towing, a reverse gear for driving in reverse, and a park setting which locks the output drive of the shiftable transmission from rotating. Exemplary shiftable transmissions and CVTs are disclosed in U.S. Pat. No. 6,725,962 and U.S. Pat. No. 6,978,857, the disclosures of which are expressly incorporated by reference herein.

Figure 16A:
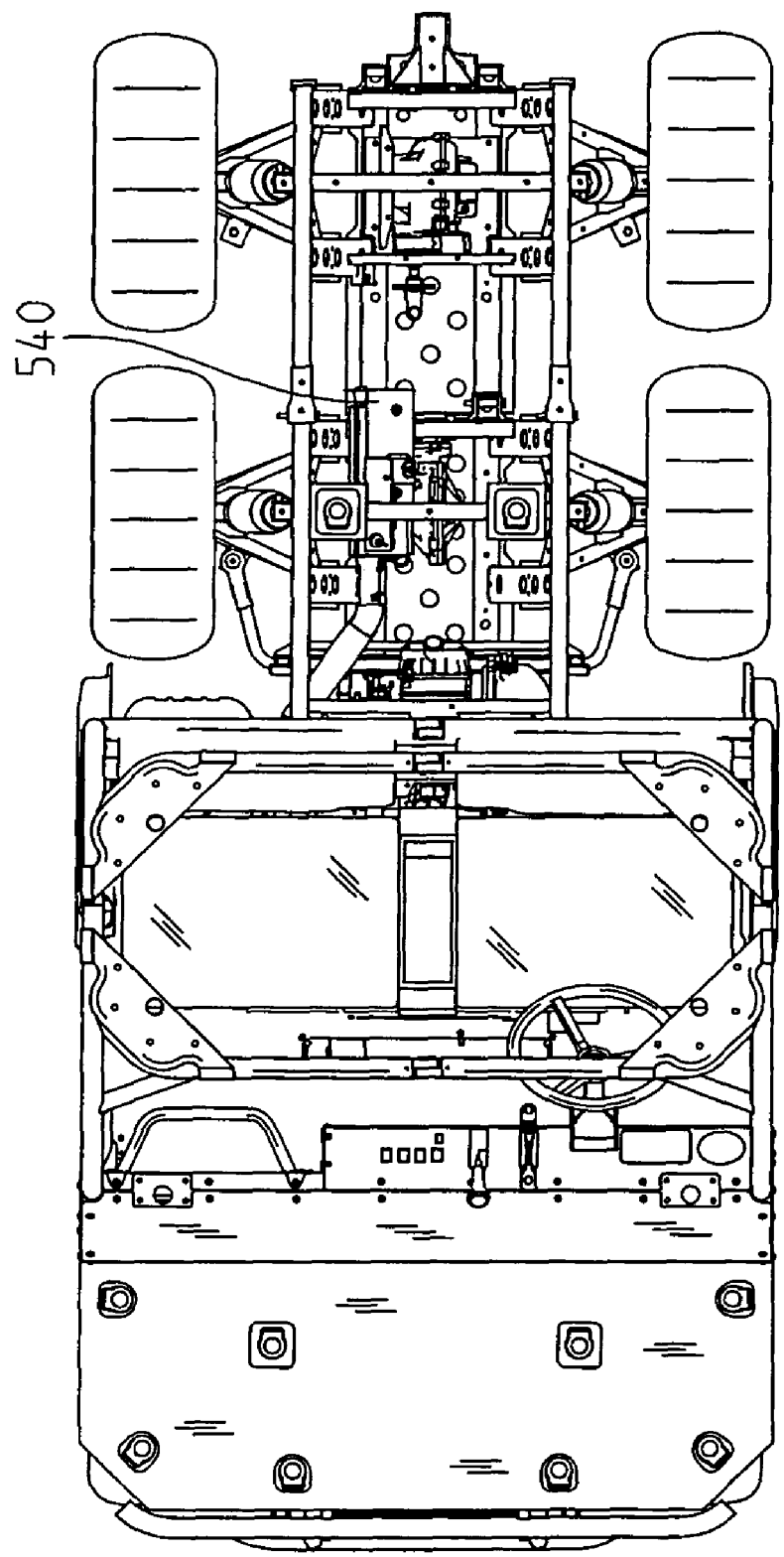
FIG. 16A is a top view of vehicle 100 without the rear platform illustrating the location of the exhaust.
Figure 16B:
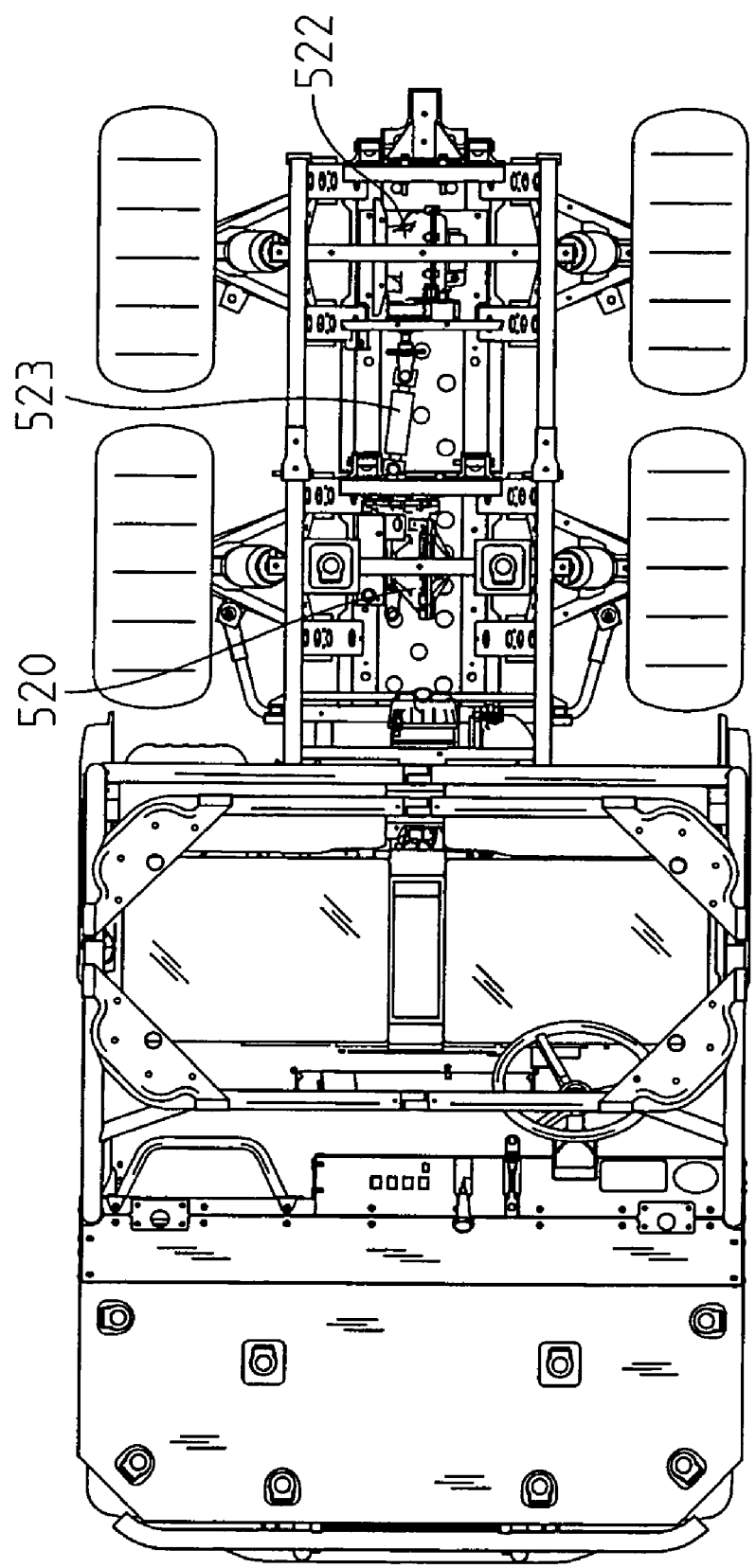
FIG. 16B is a top view of the vehicle 100 with the exhaust removed.

The operation of engine 500 and transmission 502 are controlled through one or both of operator inputs 508 (such as controls 120) and an electrical control module 510 ("ECM") having software to control the operation of engine 500 based on operator inputs 508 and sensors which monitor engine 500 and software to control the operation of differentials 520, 522, and 524. Engine 500 is connected to air intakes and an exhaust system 512. Additional details regarding exemplary air intakes are provided in U.S. Provisional Application Ser. No. 60/918,556, filed Mar. 16, 2007, titled "VEHICLE". In one embodiment, as shown in FIG. 16A, exhaust system 512 includes a muffler 540 which is coupled to base frame 210. FIG. 16B shows the same vehicle with muffler 540 removed and drive shaft 523 added.

Transmission 502 is coupled to main (or intermediate) differential 520 and a front differential 524 through drive shafts 521 and 525, respectively. Drive shafts 521 and 525, like other drive shafts mentioned herein, may include multiple components and are not limited to straight shafts. Front differential 524 includes two output shafts 530A and 530B, each coupling a respective ground engaging member 102 of axle 106 to front differential 524. Intermediate differential 520 includes two output shafts 532A and 532B, each coupling a respective ground engaging member 102 of axle 108 to differential 520. Intermediate differential 520 is connected to a rear differential 522 of modular subsection 112 through drive shaft 523. Differential 522 of first modular sub-section 112 is connected to second modular subsection 112 through drive shaft 527. Differential 522 includes two output shafts 534A and 534B, each coupling a respective ground engaging member 102 of axle 110 to differential 522. As such, the ground engaging members 102 of modular subsections 112 are coupled to rear differential 520 through modular section differential 522 and drive shaft 523 coupling rear differential 520 and modular section differential 522.

Various configurations of front differential 524, rear differential 520, and modular differential 522 are contemplated. Regarding front differential 524, in one embodiment front differential 524 has a first configuration wherein power is provided to both of the wheels of front axle 106 and a second configuration wherein power is provided to one of the wheels of axle 106, such as the wheel having the less resistance relative to the ground.

In one embodiment, front differential 524 includes active descent control ("ADC"). ADC is an all wheel drive system that provides on-demand torque transfer to the front wheels with a front drive and is also capable of providing engine braking torque to the front wheels with a back drive. Both the front drive and the back drive are portions of front differential 524 and may be active or inactive. In the case of the front drive, when active, power is provided to both of the wheels of front axle 106 and, when inactive, power is provided to one of the wheels of front axle 106. In the case of the back drive, when active, engine braking is provided to the wheels of front axle 106 and, when inactive, engine braking is not provided to the wheels of front axle 106.

The front drive aspect of front differential 524 is accomplished by the use of two bidirectional over running clutches located in a centralized front gearcase as explained in more detail in U.S. Pat. No. 5,036,939, the disclosure of which is expressly incorporated by reference herein. The engine braking aspect of the back drive of front differential 524 is accomplished by coupling clutch packs between each of the front driving wheels and the front gearcase, such that the clutch packs are selectively engaged when specific vehicle requirements are met. In one embodiment, the specific vehicle requirements are an operator input 508 is switched to an "On" position, (see U.S. Provisional Application Ser. No. 60/918,556, filed Mar. 16, 2007, titled "VEHICLE", and/or U.S. Provisional Application Ser. No. 60/918,444, filed Mar. 16, 2007, titled "VEHICLE WITH SPACE UTILIZATION", for location of switch in operator cab 114), the throttle of vehicle 100 is closed, and the speed of vehicle 100 is less than about 15 mph. If all of the desired conditions are met, the vehicle control module (ECM 510) powers an electromagnetic coil that drives a hydraulic pump to apply pressure to the clutch packs, thereby providing a dynamic coupling between the front wheels and the rest of the driveline.

Regarding rear differential 520, in one embodiment rear differential 520 is a locked differential wherein power is provided to both of the wheels of axle 108 through output shafts 532A and 532B and drive shaft 523 is a thru shaft which may be connected to modular differential 522 or used as a power takeoff. In one embodiment, rear differential 520 is a lockable/unlockable differential relative to output shafts 532A and 532B and drive shaft 523 is a thru shaft which may be connected to modular differential 522 or used as a power takeoff. When rear differential 520 is in a locked configuration power is provided to both wheels of axle 108 through output shafts 532A and 532B. When rear differential 520 is in an unlocked configuration, power is provided to one of the wheels of axle 108, such as the wheel having the less resistance relative to the ground, through output shafts 532A and 532B. In one embodiment, rear differential 520 is a lockable/unlockable differential relative to output shafts 532A and 532B and a lockable/unlockable differential relative to drive shaft 523. In a first configuration, rear differential 520 is locked relative to output shafts 532A and 532B (power is provided to both wheels of axle 108 through output shafts 532A and 532B) and unlocked relative to drive shaft 523 (power is not provided to drive shaft 523). In a second configuration, rear differential 520 is locked relative to output shafts 532A and 532B (power is provided to both wheels of axle 108 through output shafts 532A and 532B) and locked relative to drive shaft 523 (power is provided to drive shaft 523). In a third configuration, rear differential 520 is unlocked relative to output shafts 532A and 532B (power is provided to one of the wheels of axle 108, such as the wheel having the less resistance relative to the ground, through output shafts 532A and 532B) and unlocked relative to drive shaft 523 (power is not provided to drive shaft 523). In a fourth configuration, rear differential 520 is unlocked relative to output shafts 532A and 532B (power is provided to one of the wheels of axle 108, such as the wheel having the less resistance relative to the ground, through output shafts 532A and 532B) and locked relative to drive shaft 523 (power is provided to drive shaft 523).

In one embodiment, rear differential 520 does not include drive shaft 523. This may be in the case of when only a 4×4 vehicle is contemplated or a 6×6 vehicle without power to the third axle. In this case, rear differential 520 may be either a locked differential relative to output shafts 532A and 532B or a lockable/unlockable differential relative to output shafts 532A and 532B. In one embodiment, modular differential 522 does not include an output drive shaft 527. As such, a subsequent modular unit added to vehicle 100 would not be able to receive power by simply connecting to an output shaft of differential 522 of the first modular subsection 112. In this case, modular differential 522 may be either a locked differential relative to output shafts 534A and 534B or a lockable/unlockable differential relative to output shafts 534A and 534B.

Figure 17:
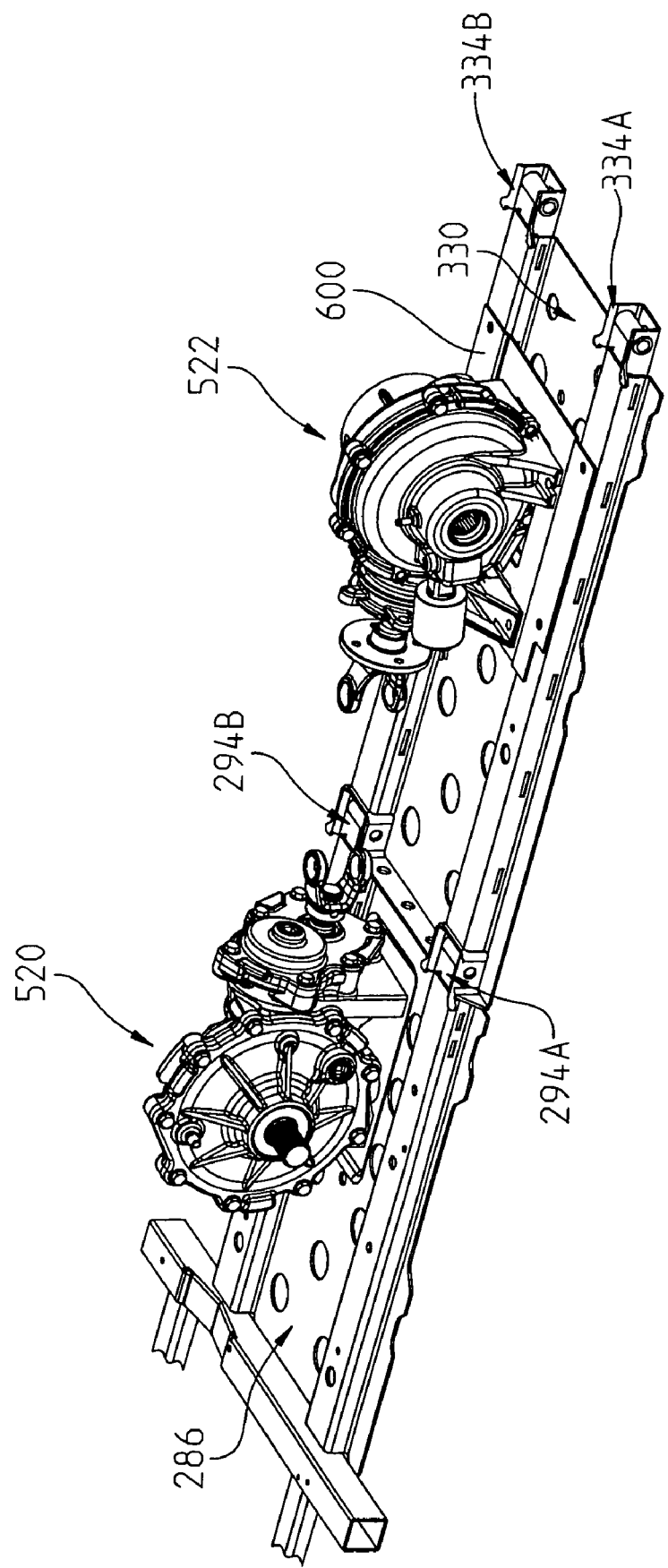
FIG. 17 illustrates a skid plate of the base frame of FIG. 9 and a skid plate of modular frame assembly of FIG. 11B, each supporting a respective drive unit.

Further, as explained herein relative to FIG. 17, modular differential 522 is mounted to a bracket 600 which may be decoupled from skid plate 330 and coupled to skid plate 286 to replace rear differential 520 if rear differential 520 fails. Both skid plate 330 and skid plate 286 have corresponding apertures to align with a mounting pattern of bracket 600. This is one example wherein the new rear differential 520 (old modular differential 522) does not include an output drive shaft other than to the respective wheels. Differential 522 is moved while mounted to bracket 600. It should be noted that in general the components of modular subsection 112 may be used to replace similar components on base portion 200 in case of failure. Such components include the differential, the wheels, and other suitable components. This interchangeability is beneficial when vehicle 100 is in remote and/or dangerous (such as a military campaign) environment.

However, in one embodiment as illustrated in FIG. 19, modular differential 522 includes an output drive shaft 527 similar to drive shaft 523 of rear differential 520. As such, a subsequent modular unit added to vehicle 100 would be able to receive power by simply connecting to output shaft 527 of differential 522 of the first modular subsection 112 or a power takeoff is provided at the rear of modular subsection 112. In this case, modular differential 522 may have any of the described configurations herein for rear differential 520 in the embodiments wherein rear differential 520 includes an drive shaft 523.

In one embodiment, either rear differential 520 or modular differential 522 are not included. In the case of rear differential 520 not being included drive shaft 521 extends to modular differential 522 and mid axle 108 is not powered. In one embodiment, wherein multiple modular subsections 112 are added, if one of the modular subsections does not include modular differential 522 then the wheels of that modular subsection are not powered. In one embodiment, front differential 524 is not included resulting in front axle 106 not being powered. In one embodiment, both rear differential 520 and modular differential 522 are not included resulting in both axle 108 and axle 110 not being powered.

Figure 21:
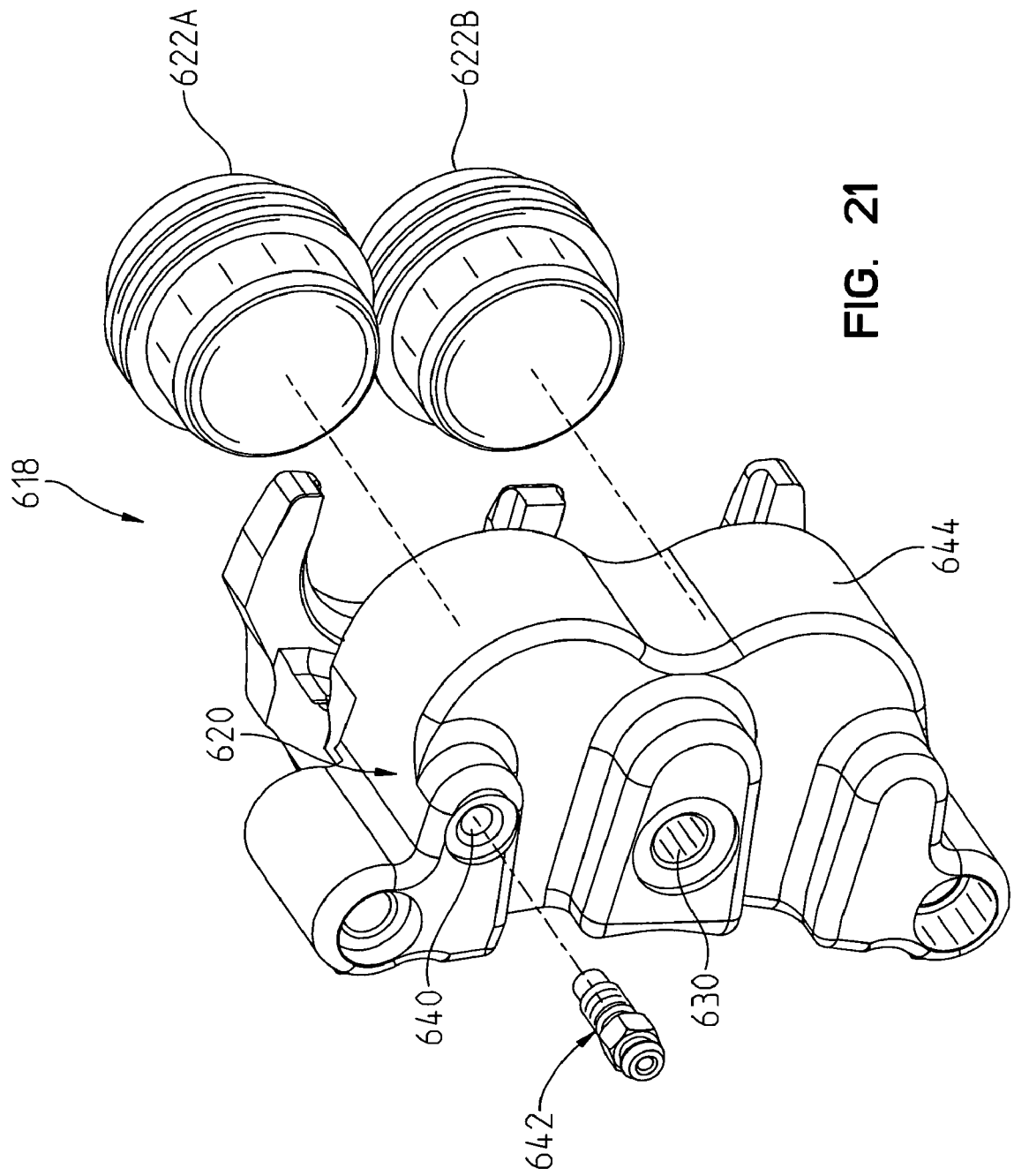
FIGS. 21-23 are an exemplary brake unit.
Figure 22:
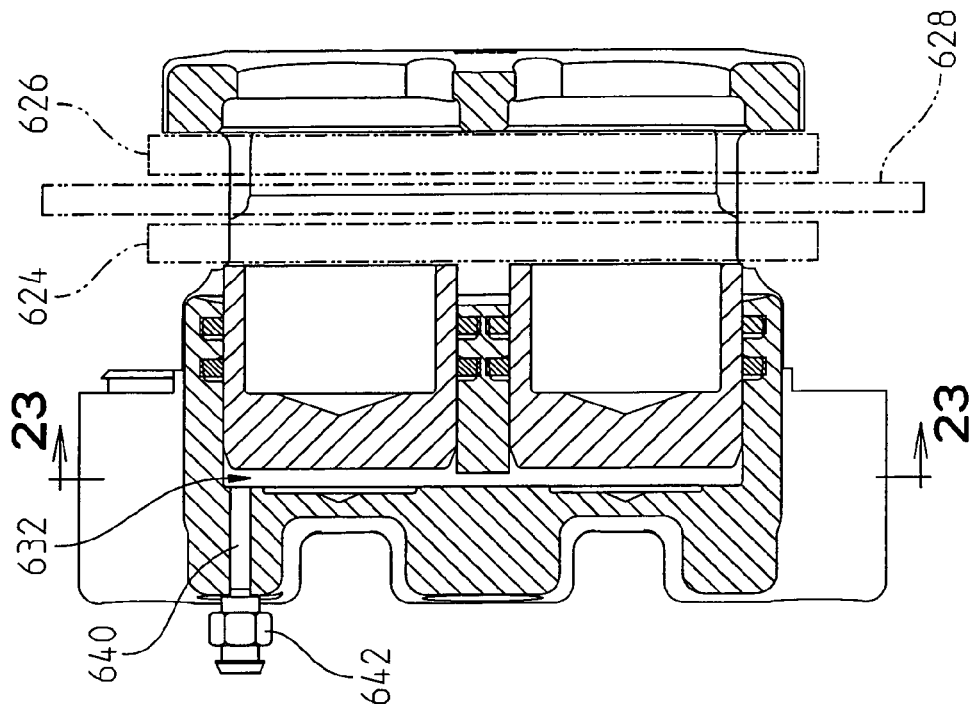
Figure 23:
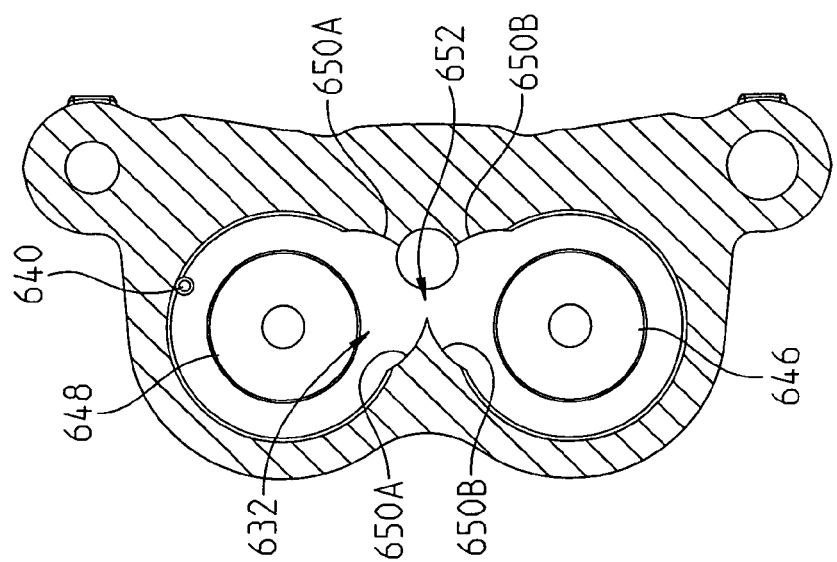

Base portion 200 further includes a braking system 516 including brake units 518 at each of the four wheels of base portion 200. In one embodiment, brake units are maintenance free brakes. Exemplary maintenance free brakes include wet brakes. In one embodiment, brake units 518 are disk brakes. In one embodiment, each disk brake includes multiple piston calipers (see FIG. 22) to provide increased braking force. Referring to FIGS. 21-23, a brake unit 618 is shown. Brake unit 618 includes a housing 620, two pistons 622A and 622B disposed within housing, a first brake pad 624 coupled to the two pistons 622A and 622B, and a second brake pad 626 spaced apart from the first brake pad 624. First brake pad 624 and second brake pad 626 are placed on opposite sides of a disk 628 that rotates with the respective wheel.

Brake fluid is introduced through inlet 630 to an area 632 on a first side of pistons 622A and 622B to move pistons 622A and 622B and hence move first brake pad 624 into contact with the disk 628 and the disk 628 into contact with second brake pad 626. Referring to FIG. 22, the area 632 in fluid communication with the first side of the pistons 622A and 622B is further in fluid communication with a bleed outlet 640. Bleed outlet 640 is in fluid communication with a bleed valve 642 on an exterior 644 of housing 620 (see FIG. 21). The shape of the area 632 behind the pistons 622A and 622B is selected such that air bubbles may move from a lower portion 646 of the area 630 to an upper portion 648 of the area 630 and out through bleed outlet 640 when bleed valve 642 is opened. In the illustrated embodiment, the area 632 includes two generally circular cuts 650A and 650B which form a passage 652 that connect a first piston chamber with a second piston chamber.

In one embodiment, drive shaft 523 of rear differential 520 is a thru shaft or is in a locked configuration when differential 520 is lockable/unlockable relative to output shafts 532A, 532B. When axle 108 is braked through braking units 518 drive shaft 523 is prevented from rotating thereby providing braking to axle 110 through the drive shaft.

Figure 24:
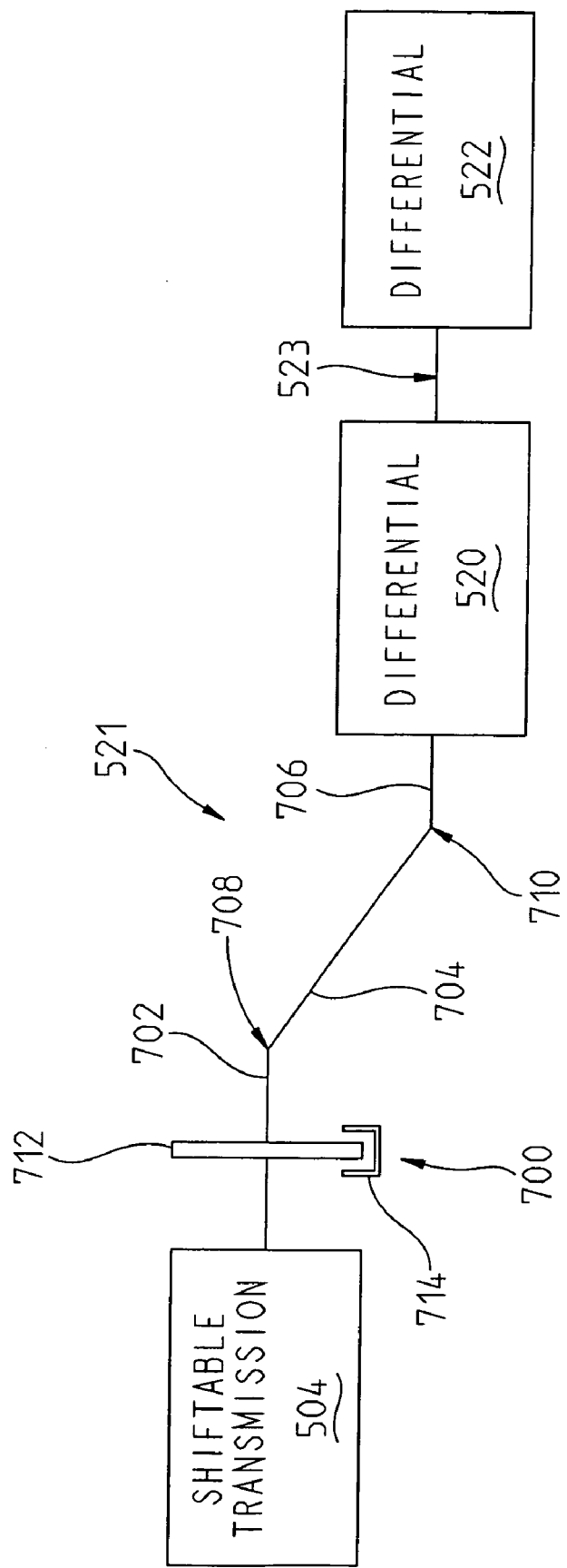
FIG. 24 is a diagrammatic representation of the location of a parking brake.

Referring to FIG. 24, a diagrammatic representation of the placement of a parking brake 700 is described. Shiftable transmission 504 is coupled to differential 520 through drive shaft 521 and differential 520 is coupled to differential 522 through drive shaft 523. In the illustrated embodiment, drive shaft 521 includes three components 702, 704, and 706 connected through two U-joints 708 and 710. Further, components 702, 704, and 706 are not axially aligned. By having a jointed drive shaft 521, differential 520 does not need to be placed at the same elevation as shiftable transmission 504 and/or laterally at the same location as shiftable transmission 504. In embodiment, drive shaft 521 is a single piece drive shaft.

Regarding parking brake 700, a disk 712 is coupled directly to drive shaft 521. Disk 712 interacts with a caliper 714 which limits the rotation of disk 712 to engage the parking brake 700. In the illustrated embodiment, disk 712 is coupled to portion 702 of drive shaft 521 that exits shiftable transmission 504 or is coupled to an output shaft of shiftable transmission 504. In one embodiment, parking brake 700 is located between shiftable transmission 504 and differential 520. In one embodiment, parking brake 700 is coupled to drive shaft 521 and is located on a first portion of drive shaft 521 between shiftable transmission 504 and a first joint 708 of drive shaft 521.

Figure 25:
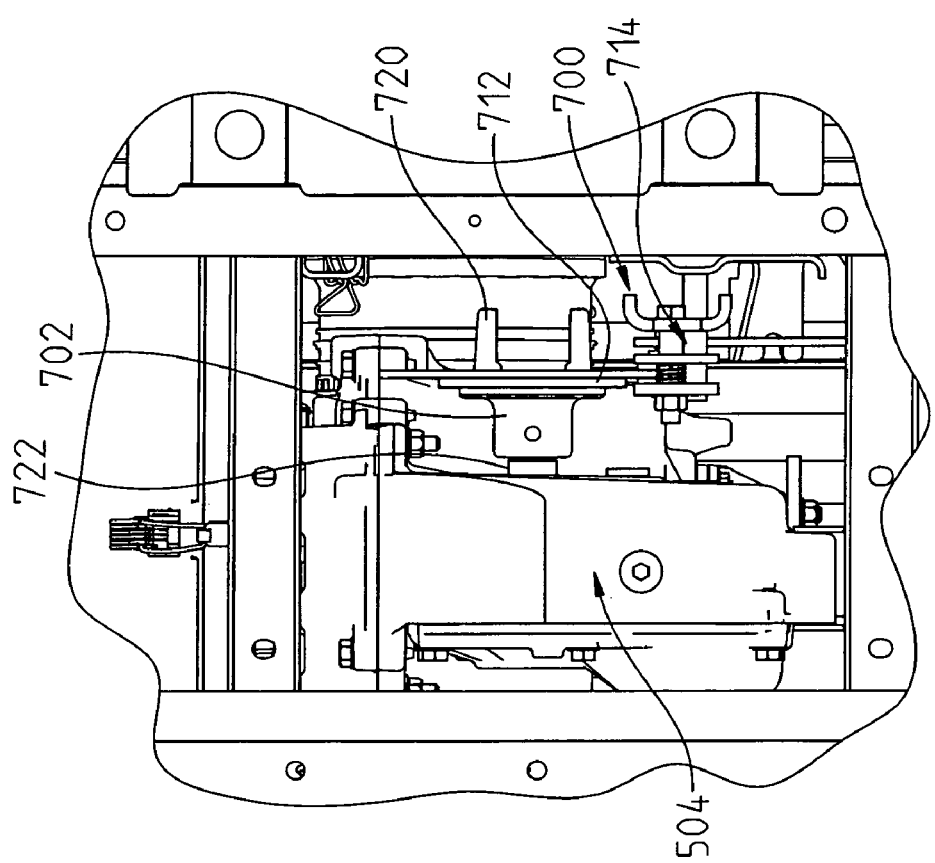
FIG. 25 is a bottom view of the vehicle of FIG. 1, illustrating an exemplary parking brake.

Referring to FIG. 25, an exemplary embodiment of parking brake 700 is shown. Parking brake disk 712 is coupled to a first portion 702 of drive shaft 521 having a clevis which forms a portion of U-joint 708. First portion 702 of drive shaft 521 is coupled to an output shaft 722 of shiftable transmission 504. Referring to FIG. 10, cross member 224 of frame 210 includes a recess 730 to accommodate disk 712 of parking brake 700.

In one embodiment, when the parking brake is applied ECM 510 limits the rpm of engine 500 to a lower level, such as below CVT engagement. In one embodiment ECM 510 receives an input from one of a switch on the parking brake 700 or a light associated with controls 120 or a speedometer that the parking brake is applied. By limiting the engine, an operator is prevented from driving off with the parking brake applied and subsequently causing damage to the pads of the parking brake and/or a drive belt of the CVT.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A utility vehicle comprising:
   a plurality of ground engagement members;
   a main frame supported by a first portion of the plurality of ground engagement members, the first portion of the plurality of ground engagement members arranged on a plurality of longitudinally spaced axles;
   a modular frame supported by a second portion of the plurality of ground engagement members;
   an engine supported by the main frame and configured to provide power to at least one of the plurality of ground engagement members of the second portion of the ground engagement members;
   a transmission operatively coupled to the engine, the transmission includes a continuously variable transmission which receives power from the engine and provides power to the at least one of the plurality of ground engagement members of the second portion of the ground engagement members;
   an operator area supported by the main frame, the operator area including seating for at least two occupants in a side-by-side arrangement, steering controls operatively coupled to at least a portion of the plurality of ground engagement members, and engine controls operatively coupled to the engine, wherein the modular frame is removably coupled to the main frame through at least three spaced apart connections which substantially prevent the modular frame from pivoting relative to the main frame when the modular frame is coupled to the main frame.

2. The utility vehicle of claim 1, further comprising a rear platform rearward of the operator area supported by the main frame and a front platform forward of the operator area supported by the main frame.

3. The utility vehicle of claim 1, further comprising a hitch receiver, wherein the hitch receiver may be coupled to a rear portion of the main frame or a rear portion of the modular frame.

4. The utility vehicle of claim 1, wherein the plurality of ground engagement members are arranged on a front axle, a rear axle, and at least one intermediate axle, the first portion of the plurality of ground engagement members being arranged on the front axle and at least a first intermediate axle and the second portion of the plurality of ground engagement members being arranged on the rear axle.

5. The utility vehicle of claim 1, wherein a plane defined by the at least three spaced apart connections is angled relative to horizontal.

6. The utility vehicle of claim 1, wherein the seating of the operator area is positioned directly above the main frame.

7. The utility vehicle of claim 1, wherein at least two of the at least three connections each includes a frame member provided on the main frame which cooperates with a receiver of the modular frame.

8. The utility vehicle of claim 7, wherein said each of the at least two of the at least three connections includes an aperture located in the frame member which is aligned with a corresponding aperture in the corresponding receiver of the modular frame; and a coupling member which cooperates with the aperture located in the frame member and the corresponding aperture in the corresponding receiver to couple the corresponding receiver to the frame member.

9. The utility vehicle of claim 1, wherein one of the at least three coupling portions includes a hitch receiver supported by the main frame which cooperates with a hitch member supported on the modular frame.

10. The utility vehicle of claim 9, wherein the hitch receiver includes a recess which receives the hitch member, both the hitch receiver and the hitch member including an aperture into which a coupling member is presented to secure the hitch member to the hitch receiver.

11. The utility vehicle of claim 1, wherein the main frame includes a main lower frame, a main upper frame, and a plurality of upstanding members coupling the main upper frame to the main lower frame and wherein the modular frame includes a modular lower frame, a modular upper frame, and a plurality of upstanding members coupling the modular upper frame to the modular lower frame.

12. The utility vehicle of claim 11, wherein the modular upper frame is coupled to the main upper frame, the modular lower frame is coupled to the main lower frame, and the plurality of upstanding members of the modular frame are spaced apart from the plurality of upstanding members of the main frame.

13. A utility vehicle comprising:
   a plurality of ground engagement members;
   a main frame supported by a first portion of the plurality of ground engagement members;
   a modular frame supported by a second portion of the plurality of ground engagement members;
   an engine supported by the main frame and configured to provide power to at least one of the plurality of ground engagement members, the engine being operatively coupled to the second portion of the ground engagement members;
   an operator area supported by the main frame, the operator area including seating for at least two occupants in a side-by-side arrangement, steering controls operatively coupled to at least a portion of the plurality of ground engagement members, and engine controls operatively coupled to the engine, wherein the modular frame is removably coupled to the main frame through at least three spaced apart connections which substantially prevent the modular frame from pivoting relative to the main frame when the modular frame is coupled to the main frame, wherein the plurality of ground engagement members are arranged on a front axle, a rear axle, and at least one intermediate axle, the first portion of the plurality of ground engagement members being arranged on the front axle and at least a first intermediate axle and the second portion of the plurality of ground engagement members being arranged on the rear axle, about 65% of a weight of the vehicle is supported by the first intermediate axle.

14. A utility vehicle comprising:
a plurality of ground engagement members;
a main frame supported by a first portion of the plurality of ground engagement members;
a modular frame supported by a second portion of the ground engagement members; and
an engine supported by the main frame and configured to provide power to at least one of the first portion of the plurality of ground engagement members and to at least one of the second portion of the plurality of ground engagement members; wherein the modular frame is removably coupled to the main frame through at least three spaced apart connections which substantially prevent the modular frame from pivoting relative to the main frame when the modular frame is coupled to the main frame and wherein the plurality of ground engagement members are arranged on a front axle, a rear axle, and at least one intermediate axle, the first portion of the plurality of ground engagement members being arranged on the front axle and at least a first intermediate axle and the second portion of the plurality of ground engagement members being arranged on the rear axle, wherein the second portion of the plurality of ground engagement members are further arranged on a second intermediate axle.

15. The utility vehicle of claim 14, wherein a plane defined by the at least three spaced apart connections is angled relative to horizontal.

16. The utility vehicle of claim 14, wherein the seating of the operator area is positioned directly above the main frame.

17. A utility vehicle comprising:
a plurality of ground engagement members;
a main frame supported by a first portion of the plurality of ground engagement members;
a modular frame supported by a second portion of the ground engagement members; and
an engine supported by the main frame and configured to provide power to at least one of the first portion of the plurality of ground engagement members and to at least one of the second portion of the plurality of ground engagement members;
an exhaust system coupled to the engine;
a transmission operatively coupled to the engine;
a front differential operatively coupled to the transmission and to at least one ground engagement member of the front axle;
a first intermediate differential operatively coupled to the transmission and to at least one ground engagement member of the first intermediate axle; and
a rear differential operatively coupled to the transmission through a connection to the first intermediate differential and to at least one ground engagement member of the rear axle; wherein the modular frame is removably coupled to the main frame through at least three spaced apart connections which substantially prevent the modular frame from pivoting relative to the main frame when the modular frame is coupled to the main frame and the plurality of ground engagement members are arranged on a front axle, a rear axle, and at least one intermediate axle, the first portion of the plurality of ground engagement members being arranged on the front axle and at least a first intermediate axle and the second portion of the plurality of ground engagement members being arranged on the rear axle, wherein the exhaust system is completely disposed forward of the rear axle.

18. A utility vehicle comprising:
a plurality of ground engagement members;
a main frame supported by a first portion of the plurality of ground engagement members;
a modular frame supported by a second portion of the ground engagement members; and
an engine supported by the main frame and configured to provide power to at least one of the first portion of the plurality of ground engagement members and to at least one of the second portion of the plurality of ground engagement members;
a transmission operatively coupled to the engine, wherein the transmission includes a continuously variable transmission;
a front differential operatively coupled to the transmission and to at least one ground engagement member of the front axle;
a first intermediate differential operatively coupled to the transmission and to at least one ground engagement member of the first intermediate axle; and
a rear differential operatively coupled to the transmission through a connection to the first intermediate differential and to at least one ground engagement member of the rear axle; wherein the modular frame is removably coupled to the main frame through at least three spaced apart connections which substantially prevent the modular frame from pivoting relative to the main frame when the modular frame is coupled to the main frame and the plurality of ground engagement members are arranged on a front axle, a rear axle, and at least one intermediate axle, the first portion of the plurality of ground engagement members being arranged on the front axle and at least a first intermediate axle and the second portion of the plurality of ground engagement members being arranged on the rear axle.

19. The utility vehicle of claim 18, wherein each of the front differential, the first intermediate differential, and the rear differential are locked differentials.

20. The utility vehicle of claim 18, wherein the transmission further includes a shiftable transmission including a high gear setting for forward driving, a low gear setting for towing, a reverse gear setting for driving in reverse, and a park setting which locks an output drive of the shiftable transmission from rotating.

21. The utility vehicle of claim 18, wherein a plurality of brake units are provided on the front axle and on the first intermediate axle.

22. The utility vehicle of claim 21, wherein the rear axle is braked through the connection to the first intermediate differential.

23. The utility vehicle of claim 18, wherein each of the front differential and the rear differential are lockable/unlockable differentials.

24. The utility vehicle of claim 23, wherein the first intermediate differential provides power to each ground engagement member of the first intermediate axle.

25. The utility vehicle of claim 24, wherein the first intermediate differential is a locked differential.

26. The utility vehicle of claim 24, wherein the first intermediate differential is a lockable/unlockable differential.

27. A method of configuring a vehicle, comprising the steps of:
providing a functional base vehicle portion including a first plurality of ground engagement members, a main frame supported by the first plurality of ground engagement members, the first plurality of ground engagement members arranged on a plurality of longitudinally spaced axles, an engine supported by the main frame and operatively coupled to at least one of the first plurality of ground engagement members through a continuously variable transmission; and an operator area supported by the main frame, the operator area including seating for at least two occupants in a side-by-side arrangement, steering controls operatively coupled to at least a portion of the first plurality of ground engagement members, and engine controls operatively coupled to the engine;

providing a modular vehicle portion including a second plurality of ground engagement members and a modular frame supported by the second plurality of ground engagement members;

coupling the modular frame to the main frame to substantially prevent the modular frame from pivoting relative to the main frame; and operatively coupling at least one of the second plurality of ground engagement members to the engine through the continuously variable transmission.

28. The method of claim 27, further comprising the step of removing the modular vehicle portion from the functional base portion by uncoupling the modular frame from the main frame.

29. The method of claim 28, wherein the step of removing the modular vehicle portion from the functional base portion includes the step of uncoupling the at least one of the second plurality of ground engagement members from the engine.

30. The method of claim 29, wherein the modular vehicle portion includes a first differential supported by the modular frame and operatively coupled to the engine and operatively coupled to the at least one of the second plurality of ground engagement members and the step of uncoupling the at least one of the second plurality of ground engagement members from the engine includes the step of uncoupling the first differential from the engine.

31. A method of configuring a vehicle, comprising the steps of:

providing a functional base vehicle portion including a first plurality of ground engagement members, a main frame supported by the first plurality of ground engagement members, an engine supported by the main frame and operatively coupled to at least one of the first plurality of ground engagement members; and an operator area supported by the main frame, the operator area including seating for at least two occupants in a side-by-side arrangement, steering controls operatively coupled to at least a portion of the first plurality of ground engagement members, and engine controls operatively coupled to the engine;

providing a modular vehicle portion including a second plurality of ground engagement members and a modular frame supported by the second plurality of ground engagement members;

coupling the modular frame to the main frame to substantially prevent the modular frame from pivoting relative to the main frame; and operatively coupling at least one of the second plurality of ground engagement members to the engine, wherein the modular vehicle portion includes a first differential supported by the modular frame and operatively coupled to the engine and operatively coupled to at least one of the second plurality of ground engagement members and wherein the functional base vehicle portion includes a second differential supported by the main frame and operatively coupled to the engine and operatively coupled to the at least one of the first plurality of ground engagement members, the first differential being interchangeable with the second differential, and the method further comprising the steps of:

removing the second differential from the main frame;
removing the first differential from the modular frame;
coupling the first differential to the main frame; and
operatively coupling the first differential to the engine and to the at least one of the first plurality of ground engagement members.

32. The method of claim 31, further comprising the step of removing the modular vehicle portion from the functional base portion by uncoupling the modular frame from the main frame.

33. A method of configuring a vehicle, comprising the steps of:

providing a functional base vehicle portion including a first plurality of ground engagement members, a main frame supported by the first plurality of ground engagement members, an engine supported by the main frame and operatively coupled to at least one of the first plurality of ground engagement members; and an operator area supported by the main frame, the operator area including seating for at least two occupants in a side-by-side arrangement, steering controls operatively coupled to at least a portion of the first plurality of ground engagement members, and engine controls operatively coupled to the engine;

providing a modular vehicle portion including a second plurality of ground engagement members and a modular frame supported by the second plurality of ground engagement members;

coupling the modular frame to the main frame to substantially prevent the modular frame from pivoting relative to the main frame; and operatively coupling at least one of the second plurality of ground engagement members to the engine, wherein the modular vehicle portion includes a first component supported by the second plurality of ground engagement members and wherein the functional base vehicle portion includes a second component supported by the first plurality of ground engagement members, the first component being interchangeable with the second component, and the method further comprising the steps of:

removing the second component from the functional base vehicle;
removing the first component from the modular vehicle portion; and
coupling the first component to the functional base vehicle in the place of the removed second component, wherein the first component and the second component are components of a drive train of the vehicle.

34. A method of configuring a vehicle, comprising the steps of:

providing a functional base vehicle portion including a first plurality of ground engagement members, a main frame supported by the first plurality of ground engagement members, an engine supported by the main frame and operatively coupled to at least one of the first plurality of ground engagement members; and an operator area supported by the main frame, the operator area including seating for at least two occupants in a side-by-side arrangement, steering controls operatively coupled to at least a portion of the first plurality of ground engagement members, and engine controls operatively coupled to the engine;

providing a modular vehicle portion including a second plurality of ground engagement members and a modular frame supported by the second plurality of ground engagement members;

coupling the modular frame to the main frame to substantially prevent the modular frame from pivoting relative to the main frame; and operatively coupling at least one of the second plurality of ground engagement members to the engine, wherein the modular vehicle portion includes a first component supported by the second plurality of ground engagement members and wherein the functional base vehicle portion includes a second component supported by the first plurality of ground engagement members, the first component being interchangeable with the second component, and the method further comprising the steps of:

removing the second component from the functional base vehicle;

removing the first component from the modular vehicle portion; and coupling the first component to the functional base vehicle in the place of the removed second component, wherein the first component and the second component are components of a suspension of the vehicle.

35. A utility vehicle comprising:

a plurality of ground engagement members, the plurality of ground engagement members are arranged on a front axle, a rear axle, and at least one intermediate axle;

a main frame supported by a first portion of the plurality of ground engagement members;

a modular frame supported by a second portion of the ground engagement members;

an engine supported by the main frame and configured to provide power to at least one of the first portion of the plurality of ground engagement members and to at least one of the second portion of the plurality of ground engagement members; and an exhaust system coupled to the engine, wherein the modular frame is removably coupled to the main frame through at least three spaced apart connections which substantially prevent the modular frame from pivoting relative to the main frame when the modular frame is coupled to the main frame, wherein the exhaust system is completely disposed forward of the rear axle.

* * * * *